(12) United States Patent
Yoshima et al.

(10) Patent No.: US 11,201,348 B2
(45) Date of Patent: Dec. 14, 2021

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Kazuomi Yoshima, Yokohama (JP); Wen Zhang, Sagamihara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 147 days.

(21) Appl. No.: 16/122,767

(22) Filed: Sep. 5, 2018

(65) Prior Publication Data
US 2019/0296390 A1 Sep. 26, 2019

(30) Foreign Application Priority Data
Mar. 22, 2018 (JP) .............................. JP2018-054006

(51) Int. Cl.
| | |
|---|---|
| *H01M 10/0562* | (2010.01) |
| *H01M 4/62* | (2006.01) |
| *H01M 10/0525* | (2010.01) |
| *H02J 7/00* | (2006.01) |
| *H01M 4/36* | (2006.01) |
| *H01M 4/13* | (2010.01) |

(Continued)

(52) U.S. Cl.
CPC ......... *H01M 10/0562* (2013.01); *H01M 4/13* (2013.01); *H01M 4/366* (2013.01); *H01M 4/621* (2013.01); *H01M 4/624* (2013.01); *H01M 10/0525* (2013.01); *H02J 7/0026* (2013.01); *H01M 10/0585* (2013.01); *H01M 10/425* (2013.01); *H01M 10/4207* (2013.01);

(Continued)

(58) Field of Classification Search
CPC .... H01M 4/62; H01M 4/621; H01M 10/0525; H01M 10/0562; H02J 7/00; H02J 7/0026
See application file for complete search history.

(56) References Cited

U.S. PATENT DOCUMENTS

| | | | |
|---|---|---|---|
| 2013/0260250 A1 | 10/2013 | Yada et al. | |
| 2015/0372298 A1* | 12/2015 | Fujieda | H01M 10/0562 429/321 |

(Continued)

FOREIGN PATENT DOCUMENTS

| | | |
|---|---|---|
| EP | 3 296 259 A1 | 3/2018 |
| JP | 2008-210791 A | 9/2008 |

(Continued)

*Primary Examiner* — Karie O'Neill Apicella
(74) *Attorney, Agent, or Firm* — Oblon, McClelland, Maier & Neustadt, L.L.P.

(57) ABSTRACT

According to one embodiment, an electrode is provided. The electrode includes an active material-containing layer containing active material particles, ferroelectric particles, and solid electrolyte particles. A ratio ($FE_{contact}$) of the number of the ferroelectric particles in contact with the active material particles relative to the number of the ferroelectric particles included in the active material-containing layer is 85% or more. A ratio ($SE_{non-contact}$) of the number of the solid electrolyte particles not in contact with the active material particles relative to the number of the solid electrolyte particles included in the active material-containing layer is 30% or more.

13 Claims, 22 Drawing Sheets
(12 of 22 Drawing Sheet(s) Filed in Color)

(51) Int. Cl.
*H01M 10/42* (2006.01)
*H01M 4/02* (2006.01)
*H01M 10/0585* (2010.01)

(52) U.S. Cl.
CPC .......................... *H01M 2004/021* (2013.01); *H01M 2200/108* (2013.01); *H01M 2220/20* (2013.01); *H01M 2300/0065* (2013.01)

(56) References Cited

U.S. PATENT DOCUMENTS

2018/0277896 A1\* 9/2018 Yoshima ............. H01M 10/056
2019/0089010 A1\* 3/2019 Yamashita ............ H01M 4/485
2019/0260075 A1 8/2019 Yoshima et al.

FOREIGN PATENT DOCUMENTS

| | | |
|---|---|---|
| JP | 2011-065776 A | 3/2011 |
| JP | 2013-149433 A | 8/2013 |
| JP | 2014-116129 A | 6/2014 |
| JP | 5556797 B2 | 7/2014 |
| JP | 5623360 B2 | 11/2014 |
| JP | 2015-088369 A | 5/2015 |
| JP | 2016-149270 A | 8/2016 |
| JP | 2017-130471 A | 7/2017 |
| JP | 2018-156903 | 10/2018 |
| JP | 2019-145264 A | 8/2019 |
| WO | WO 2014/132320 A1 | 9/2014 |

\* cited by examiner

ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2013-054006, filed Mar. 22, 2018, the entire contents of which are incorporated herein by reference.

FIELD

Embodiments described herein relate generally to an electrode, a secondary battery, a battery pack, and a vehicle.

BACKGROUND

In recent years, research and development on nonaqueous electrolyte batteries such as a lithium ion secondary battery as high energy density batteries have been gathered pace. The nonaqueous electrolyte batteries have been expected as power sources for hybrid automobiles electric automobiles, uninterruptible power supplies for mobile phone base stations, and the like. In particular, there has been a demand for batteries with higher energy density as vehicular batteries.

It is possible to enhance the energy density of the lithium ion secondary battery by thickening an electrode layer part. However, a resistance of the battery increases since a diffusion distance of lithium ions increases along with the thickening of the electrode layer part, so that there is a problem that input/output characteristics deteriorate. It is necessary to reduce a resistance of the electrode layer part in order to achieve both the input/output characteristics and the energy density.

BRIEF DESCRIPTION OF THE DRAWINGS

This application file contains at least one drawing executed in color. Copies of this patent or patent application publication with color drawing(s) will be provided by the Office upon request and payment of the necessary fee.

DETAILED DESCRIPTION

Figure 1:
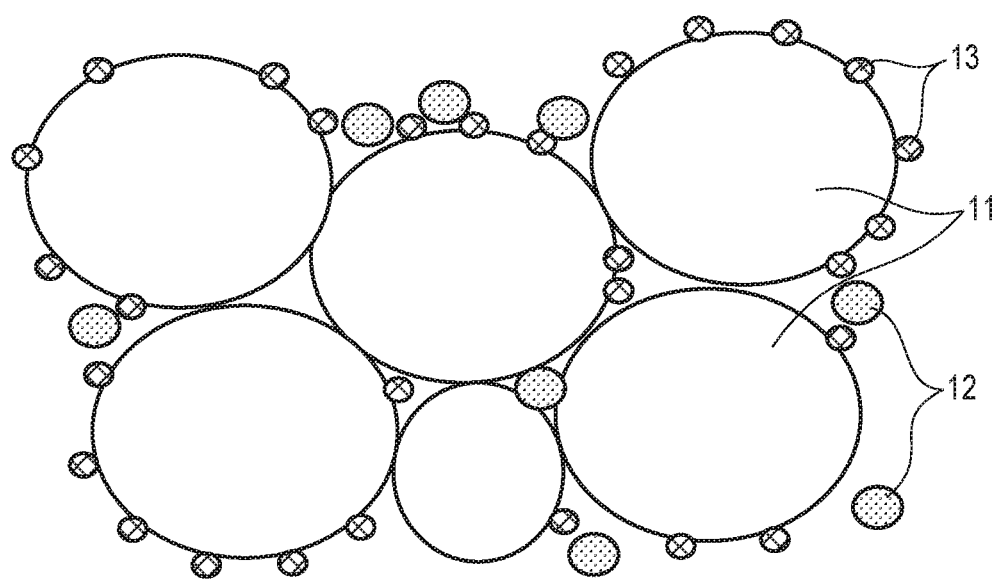
FIG. 1 is an enlarged schematic sectional view illustrating an example of an electrode according to a first embodiment.

According to a first embodiment, an electrode is provided. The electrode includes an active material-containing layer containing active material particles, ferroelectric particles, and solid electrolyte particles having a Li ion conductivity of $1\times10^{-10}$ S/cm or more at 25° C. A ratio ($FE_{contact}$) of the number of the ferroelectric particles in contact with the active material particles relative to the number of the ferroelectric particles included in the active material-containing layer is 85% or more. A ratio ($SE_{non-contact}$) of the number of the solid electrolyte particles not in contact with the active material particles relative to the number of the solid electrolyte particles included in the active material-containing layer is 30% or more.

According to a second embodiment, a secondary battery including a negative electrode, a positive electrode, and an electrolyte is provided. At least one of the negative electrode and the positive electrode is the electrode according to the first embodiment.

According to a third embodiment, a battery pack is provided. The battery pack includes the secondary battery according to the second embodiment.

According to a fourth embodiment, a vehicle is provided. The vehicle includes the battery pack according to the third embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode is provided. The electrode includes an active material-containing layer containing active material particles, ferroelectric particles, and solid electrolyte particles having a Li ion conductivity of $1\times10^{-10}$ S/cm or more at 25° C. A ratio ($FE_{contact}$) of the number of the ferroelectric particles in contact with the active material particles relative to the whole number of the ferroelectric particles included in the active material-containing layer is 85% or more. A ratio ($SE_{non-contact}$) of the number of the solid electrolyte particles not in contact with the active material particles relative to the whole number of the solid electrolyte particles included in the active material-containing layer is 30% or more.

In a lithium ion secondary battery, Li ions move between positive and negative electrodes by charging and discharging. For example, when the lithium ion secondary battery is charged, Li ions move from the positive electrode side to the negative electrode side. That is, the Li ion concentration becomes higher on the negative electrode side, thereby being positively charged. On the other hand, the Li ion concentration becomes lower on the positive electrode side, thereby being negatively charged. Since the opposite phenomenon occurs at the time of discharging, the Li ion concentration decreases at the negative electrode and the Li ion concentration increases at the positive electrode. In this manner, concentration polarization occurs between the positive and negative electrodes at the time of charging and discharging.

Accordingly, for example, as a state of charge is increased along with charging of the secondary battery, Li ions are less likely to gradually move due to repulsion of electric charges, which makes it difficult to further increase the state of charge. That is, the input/output characteristics deteriorate.

The electrode according to the embodiment contains the plurality of ferroelectric particles, and many ferroelectric particles are in contact with the active material particles and cover surfaces of the active material particles. Since the ferroelectric particles have a high relative permittivity, there is an effect of alleviating a bias of charges caused by the concentration polarization. As a result, solvation and desolvation of Li ions are likely to occur on the surfaces of the active material particles where the charge bias has been alleviated. Therefore, the electrode according to the embodiment can realize the secondary battery having excellent input/output characteristics and low temperature characteristics.

Further, the electrode according to the embodiment includes the plurality of solid electrolyte particles having a Li ion conductivity of $1\times10^{-10}$ S/cm or more. In a state where the Li ion concentration on the negative electrode side becomes high, the negative electrode side is positively charged. At this time, the state where Li ions hardly move due to the charge repulsion as described above is formed, and thus, it is necessary to cancel positive charges in the negative electrode side such that Li ions easily move in order to enhance the input/output characteristics.

When the Li ion concentration on the negative electrode side becomes high, the concentration of Li ions also becomes high at the periphery of the solid electrolyte particles present at the periphery of the negative electrode active material particles. The solid electrolyte particles contain Li, and thus, can be coordinated with anions such as $PF_6^-$ contained in electrolytes. The anions coordinated with the solid electrolytes can cancel the positive charges, for example, by ionic bonding with Li ions flowing from the positive electrode side. That is, if the solid electrolyte particles are present on the periphery of the negative electrode active material particles, it is possible to alleviate the charge bias, so that the input/output characteristics can be enhanced.

However, it is not preferable that the solid electrolyte particles excessively cover the surfaces of the active material particles in addition to the ferroelectric particles. That is, it is preferable that the ferroelectric particles are present mainly on the surfaces of the active material particles. This is because a diffusion path of Li ions is narrowed and a diffusion resistance of Li ions increases if even the solid electrolyte particles excessively cover the surfaces of the active material particles. In the electrode according to the embodiment, it is possible to sufficiently secure the Li ion diffusion path by performing control such that the solid electrolyte particles do not excessively cover the surfaces of the active material particles. As a result, it is possible to achieve excellent input/output characteristics and low temperature characteristics.

Specifically, in the active material-containing layer included in the electrode, the ratio ($FE_{contact}$) of the number of the ferroelectric particles in contact with the active material particles relative to the number of the ferroelectric particles is set to 85% or more, and the ratio ($SE_{non-contact}$) of the number of the solid electrolyte particles not in contact with the active material particles relative to the number of the solid electrolyte particles is set to 30% or more.

According to the electrode satisfying this condition, it is possible to alleviate the influence of the charge bias generated by charging and discharging in the positive electrode or the negative electrode. In addition, the diffusion path of Li is not excessively narrowed by the ferroelectric particles and the solid electrolyte particles, and thus, it is possible to suppress an increase in resistance in the active material-containing layer. As a result, the electrode according to the embodiment can realize the secondary battery exhibiting high input/output characteristics.

In addition, a diffusion resistance of Li ions in the active material-containing layer is low in the electrode including the active material-containing layer as described above. Therefore, even when the thickness of the active material-containing layer is made relatively thick, this electrode can exhibit excellent input/output characteristics. Therefore, the electrode according to the embodiment can realize the secondary battery exhibiting a high-volume energy density.

As described above, the electrode according to the embodiment can realize the secondary battery having excellent input/output characteristics and energy density.

In the present specification, "$FE_{contact}$" means the ratio of the number of the ferroelectric particles in contact with the active material particles relative to the number of all the ferroelectric particles contained in the active material-containing layer. In addition, "$SE_{non-contact}$" means the ratio of the number of the solid electrolyte particles not in contact with the active material particles relative to the number of all the solid electrolyte particles contained in the active material-containing layer.

Hereinafter, the electrode according to the embodiment will be described in detail.

The electrode includes the active material-containing layer that contains an active material. The electrode can further contain a current collector. The active material-containing layer can be formed on one side or both sides of the current collector. The active material-containing layer contains a plurality of active material particles, a plurality of ferroelectric particles, and a plurality of solid electrolyte particles having a Li ion conductivity of $1\times10^{-10}$ S/cm or more at 25° C. The active material-containing layer may further contain a conductive agent and a binder. The electrode is, for example, an electrode for a battery or an electrode for a secondary battery. The electrode may be a positive electrode containing a positive electrode active material or a negative electrode containing a negative electrode active material.

The active material-containing layer is a sheet-shaped layer that can be formed on one side or both sides of the current collector. The thickness of the active material-containing layer is, for example, within a range of 20 μm to 80 μm.

A state of presence of each particle in the active material-containing layer will be described with reference to FIG. 1. FIG. 1 is an enlarged schematic view illustrating an example of a cross section when the active material-containing layer is cut along a thickness direction.

As illustrated in FIG. 1, the active material-containing layer contains a plurality of active material particles 11, a plurality of solid electrolyte particles 12, and a plurality of ferroelectric particles 13. The active material-containing layer contains a conductive agent and a binder although illustrations thereof are omitted.

The plurality of active material particles 11 are dispersed in the active material-containing layer. The active material particles 11 may be in contact with or not necessarily in contact with the active material particles 11 adjacent thereto. The active material particles 11 are preferably in contact with the adjacent active material particles 11 in order to form a favorable conductive path.

Most of the plurality of ferroelectric particles 13 contained in the active material-containing layer are present on surfaces of the dispersed active material particles 11. That is, most of the ferroelectric particles 13 are present in the state of being in contact with the active material particles 11. When a distance between the active material particle 11 and the ferroelectric particle 13 is within 2 μm even if the ferroelectric particles 13 are not in contact with the active material particles 11, it can be regarded that the ferroelectric particles 13 are present on surfaces of the active material particles 11. A ratio ($FE_{contact}$) of the number of the ferroelectric particles 13 in contact with the active material particles 11 relative to the number of the ferroelectric particles 13 contained in the active material-containing layer is 85% or more. This ratio is preferably 90% or more, more preferably 93% or more, and even more preferably 96% or more. As the ratio ($FE_{contact}$) is higher, the effect of alleviating the charge bias is higher when the concentration polarization occurs between the positive and negative electrodes due to charging and discharging, and thus, it is possible to further improve the input/output characteristics. The ratio ($FE_{contact}$) of the number of the ferroelectric particles 13 in contact with the active material particles 11 relative to the number of the ferroelectric particles 13 contained in the active material-containing layer can be determined using an element mapping image obtained by SEM-EDX to be described later.

On the other hand, most of the plurality of solid electrolyte particles 12 contained in the active material-containing layer are present in the state of not being in contact with the dispersed active material particles 11. Some of the plurality of solid electrolyte particles 12 may be in contact with the active material particles 11. A ratio ($SE_{non-contact}$) of the number of the solid electrolyte particles 12 not in contact with the active material particles 11 relative to the number of the solid electrolyte particles 12 contained in the active material-containing layer is 30% or more. This ratio is preferably 50% or more, and more preferably 70% or more.

When the ratio ($SE_{non-contact}$) is 30% or more, the charge bias on the positive electrode side or the negative electrode side can be alleviated, and thus, it is possible to enhance the input/output characteristics. The ratio ($SE_{non-contact}$) of the number of the solid electrolyte particles 12 not in contact with the active material particles 11 relative to the number of the solid electrolyte particles 12 contained in the active material-containing layer can be determined using the element mapping image obtained by SEM-EDX to be described later.

If the ratio of the solid electrolyte particles 12 in contact with the active material particles 11 is too high, as described above, it is not preferable because the diffusion path of lithium is likely to be excessively narrowed by the solid electrolyte particles. Therefore, the ratio of the number of the solid electrolyte particles in contact with the active material particles relative to the number of the solid electrolyte particles contained in the active material-containing layer is preferably 50% or less, and more preferably 30% or less.

Next, a case where the electrode according to the embodiment is a negative electrode and a case where the electrode is a positive electrode will be described in detail. First, the negative electrode will be described.

The negative electrode can include a negative electrode current collector and a negative electrode active material-containing layer. The negative electrode active material-containing layer can be formed on one side or both sides of the negative electrode current collector. The negative electrode active material-containing layer contains a negative electrode active material, ferroelectric particles, and solid electrolyte particles. The negative electrode active material-containing layer can arbitrarily contain a conductive agent and a binder.

As the negative electrode active material, those capable of allowing lithium ions to be inserted thereinto and extracted therefrom can be used, and examples thereof can include a carbon material, a graphite material, a lithium alloy material, a metal oxide, and a metal sulfide. The negative electrode active material preferably contains a titanium oxide whose insertion and extraction potential of lithium ion is within a range of 1 V to 3 V (vs. Li/Li$^+$).

Examples of the titanium oxide include lithium titanate (for example, $Li_{2+y}Ti_3O_7$, $0 \leq y \leq 3$) having a ramsdellite structure, lithium titanate (for example, $Li_{4+x}Ti_5O_{12}$, $0 \leq x \leq 3$) having a spinel structure, monoclinic titanium dioxide ($TiO_2$), anatase titanium dioxide, rutile titanium dioxide, a hollandite titanium composite oxide, an orthorhombic titanium-containing composite oxide, and a monoclinic niobium titanium composite oxide.

An example of the orthorhombic titanium-containing composite oxide is a compound represented by $Li_{2+a}M(I)_{2-b}Ti_{6-c}M(II)_dO_{14+\sigma}$. Here, M(I) is at least one selected from the group consisting of Sr, Ba, Ca, Kg, Na, Cs, Rb, and K. M(II) is at least one selected from the group consisting of Zr, Sn, V, Nb, Ta, Mo, W, Y, Fe, Co, Cr, Mn, Ni, and Al. Each subscript in the composition formulas is given such that $0 \leq a \leq 6$, $0 \leq b < 2$, $0 \leq c < 6$, $0 \leq d < 6$, and $-0.5 \leq \sigma \leq 0.5$. A specific example of the orthorhombic titanium-containing composite oxide is $Li_{2+a}Na_2Ti_6O_{14}$ ($0 \leq a \leq 6$).

An example of the monoclinic niobium titanium composite oxide is a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. Each subscript in the composition formulas is given such that $0 \leq x \leq 5$, $0 \leq y<1$, $0 \leq z<2$, and $-0.3 \leq \delta \leq 0.3$. A specific example of the monoclinic niobium titanium composite oxide is $Li_xNb_2TiO_7$ ($0 \leq x \leq 5$).

Another example of the monoclinic niobium titanium composite oxide is a compound represented by $Ti_{1-y}M3_{y+z}Nb_{2-z}O_{7-\delta}$. Here, M3 is at least one selected from the group consisting of Mg, Fe, Ni, Co, W, Ta, and Mo. Each subscript in the composition formulas is given such that $0 \leq y<1$, $0 \leq z \leq 2$, and $-0.3 \leq \delta \leq 0.3$.

For example, the negative electrode active material particles may be in the form of primary particles or in the form of secondary particles obtained by aggregation of primary particles. The negative electrode active material particles may be a mixture of primary particles and secondary particles. In order to increase the number of ferroelectric particles carried on surfaces of the primary particles, it is desirable that the mass of the primary particles accounting for the whole negative electrode active material particles is larger than the mass of the secondary particles.

An average primary particle size of the negative electrode active material is preferably 1 μm or smaller. When the average primary particle size is 1 μm or smaller, it is possible to suppress a coverage rate of the ferroelectric particles on the surfaces of the active material particles from being excessively increased. As an example, a case where a predetermined amount of active material particles and a predetermined amount of ferroelectric particles are used is discussed below. If an average primary particle size of the active material particles is small, the specific surface area of the active material particles becomes large. Since the surface area of the active material particles that can be covered with the predetermined amount of ferroelectric particles is limited, when the average primary particle size of the active material particles is small, the area, which can be covered with the ferroelectric particles, among the surfaces of the active material particles also becomes small. That is, it is possible to suppress the area (coverage rate) covered with the ferroelectric particles from being excessively increased with respect to the surface area of the active material particles when the average primary particle size of the active material particles is small. As a result, a diffusion path of Li ions to the active material particles is sufficiently secured, and it is possible to enhance the input/output characteristics. In addition, when the average primary particle size of the active material particles is small, a diffusion distance of lithium ions inside the particles becomes short and the specific surface area is increased, and thus, it is possible to enhance the input/output characteristics. A more preferable average primary particle size is from 0.1 μm to 0.8 μm. There is a risk that the distribution of electrolytes may be biased on the negative electrode to cause depletion of the electrolyte in the positive electrode, and thus, the average primary particle size of the negative electrode active material particles is preferably 0.001 μm or larger.

An average particle size (diameter) of the secondary particles of the negative electrode active material particles is preferably larger than 5 μm. This average particle size is more preferably within a range of 7 μm to 20 μm. Within this range, it is possible to produce a high-density negative electrode while keeping the pressure of a negative electrode press low, and it is possible to suppress elongation of an aluminum foil current collector.

A Brunauer, Emmett, and Teller (BET) specific surface area of the negative electrode active material is preferably within a range of 3 m²/g to 200 m²/g. Within this range, it is possible to suppress the coverage rate of the ferroelectric particles on the active material particles surfaces from being excessively increased. Within this range, it is possible to enhance affinity with the electrolyte, and thus, the input/output characteristics are enhanced.

The ferroelectric particles are particles having a high relative permittivity. The relative permittivity of the ferroelectric particles is, for example, within a range of 1 to 7000 and preferably within a range of 5 to 5000. Even if the charge bias between the positive and negative electrodes becomes large, the charge bias can be sufficiently alleviated when the relative permittivity of the ferroelectric particles is within this range. The negative electrode active material-containing layer may contain only one kind of ferroelectric particles or two or more kinds of ferroelectric particles.

A Li ion conductivity of the ferroelectric particle is less than $1 \times 10^{-10}$ S/cm at 25° C.

An average primary particle size of the ferroelectric particles is, for example, within a range of 0.001 μm to 0.1 μm, and preferably within a range of 0.005 μm to 0.05 μm. The average primary particle size of the ferroelectric particles is preferably smaller than the the average primary particle size of the active material particles in order to cause the ferroelectric particles to exhibit the effect of alleviating the charge bias and to enhance the input/output characteristics. This is because the ferroelectric particles function on or near the surfaces of the active material particles.

Examples of the ferroelectric particle include barium titanate, zirconia, titania, and alumina. Among them, the barium titanate is preferably contained since the relative permittivity thereof is high.

The solid electrolyte particle has a Li ion conductivity of $1 \times 10^{-10}$ S/cm or more at 25° C. The Li ion conductivity of the solid electrolyte particle at 25° C. is more preferably $1 \times 10^{-5}$ S/cm or more.

An average primary particle size of the solid electrolyte particles is, for example, within a range of 0.1 μm to 5 μm, and preferably within a range of 0.2 μm to 1 μm. When the average primary particle size of the solid electrolyte particles is within this range, a sufficient specific surface area for contact with an electrolyte solution can be obtained, and thus, the charge bias is easily alleviated.

The solid electrolyte particle is preferably, for example, an inorganic compound represented by $LiM_2(PO_4)_3$ having a NASICON skeleton (M is at least one selected from Ti, Ge, Sr, Zr, Sn, and Al). Among them, $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$ are preferable because of their high ion conductivity and high electrochemical stability. In the above compounds, x is preferably within a range of 0 to 0.5.

A lithium ion conductivity at 25° C. of the inorganic compound represented by $LiM_2(PO_4)_3$ having a NASICON skeleton is, for example, within a range of $1 \times 10^{-3}$ S/cm to $1 \times 10^{-5}$ S/cm.

The solid electrolyte particle preferably contains an oxide that is represented by a general formula of $Li_{1+2x}M1_{2-x}(Ca_{1-y}M2_y)_x(PO_4)_3$. In the formula, M1 is at least one selected from the group consisting of Zr and Hf, M2 is at least one selected from the group consisting of Sr and Ba, x is within a range of $0<x<2$, and y is within a range of $0<y \leq 1$. A specific example of the oxide represented by the general formula $Li_{1+2x}M1_{2-x}(Ca_{1-y}M2_y)_x(PO_4)_3$ can be LZCP ($Li_{1.2}Zr_{1.9}Ca_{0.1}(PO_4)_3$). A lithium ion conductivity of LZCP at 25° C. is $1 \times 10^{-4}$ S/cm.

Another example of the solid electrolyte particle includes an oxide such as amorphous LIPON ($Li_{2.9}PO_{3.3}N_{0.46}$) and garnet type LLZ ($Li_7La_3Zr_2O_{12}$).

A lithium ion conductivity of LIPON ($Li_{2.9}PO_{3.3}N_{0.46}$) at 25° C. is $3\times10^{-6}$ S/cm. A lithium ion conductivity of garnet type LLZ ($Li_7La_3Zr_2O_{12}$) at 25° C. is $3\times10^{-4}$ S/cm.

Examples of the oxide having a garnet structure include $Li_{5+x}A_yLa_{3-y}M_2O_{12}$ (A is at least one selected from the group consisting of Ca, Sr, and Ba, and M is at least one selected from the group consisting of Nb and Ta), $Li_3M_{2-x}Zr_2O_{12}$ (M is at least one selected from the group consisting of Ta and Nb), $Li_{7-3x}Al_xLa_3Zr_3O_{12}$, and $Li_7La_3Zr_2O_{12}$. In the above compounds, x satisfies, for example, $0 \leq x < 0.8$, and preferably $0 \leq x \leq 0.5$. For example, y satisfies $0 \leq y < 2$. The oxide having the garnet structure may be one kind of these compounds or may contain a mixture of at least two kinds of these compounds. Among them, $Li_{6.25}Al_{0.25}La_3Zr_3O_{12}$ and $Li_7La_3Zr_2O_{12}$ have a high ion conductivity and are electrochemically stable, and thus, have excellent discharge performance and cycle life performance.

The solid electrolyte particle may be only one kind selected from the above compounds or may contain a mixture of at least two kinds of the compounds.

The solid electrolyte particle may contain a polymeric solid electrolyte particle. The solid electrolyte particle may be a polymeric solid electrolyte particle. The polymeric solid electrolyte particle contains, for example, a polymeric material having a lithium ion conductivity and electrolyte salt. Since such a polymeric material also functions as a binder in the active material-containing layer, the solid electrolyte particle preferably contains the polymeric solid electrolyte particle. The polymeric solid electrolyte particle may further contain a solvent such as an organic solvent.

Examples of the above-described polymeric material include a polyether-based material, a polyester-based material, a polyamine-based material, a polyethylene-based material, a silicone-based material and a polysulfide-based material.

As the electrolyte salt, for example, an electrolyte salt contained in an electrolyte to be described later can be used.

A conductive agent is added in order to increase the current-collecting performance and suppress the contact resistance between the active material and the current collector. Examples of the conductive agent include carbonaceous materials such as vapor grown carbon fiber (VGCF) and carbon black. Examples of the carbon black include acetylene black and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles.

A binder is added in order to fill a gap between dispersed active materials and bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of the CMC. One of these materials may be used as the binder, or two or more of these materials may be combined and used as the binder.

Mixing ratios of the negative electrode active material particles, the ferroelectric particles, the solid electrolyte particles, the conductive agent, and the binder in the negative electrode active material-containing layer are ratios of 70% by mass to 99% by mass, 0.1% by mass to 5% by mass, 0.1% by mass to 5% by mass, 0.1% by mass to 20% by mass, and 0.1% by mass to 10% by mass, respectively.

When the content of the ferroelectric particles is set within the above numerical range, it is possible to obtain the effect of alleviating the charge bias using the ferroelectric particles without impairing the energy density.

When the content of the solid electrolyte particles is set within the above numerical range, it is possible to obtain the effect of alleviating the charge bias using the solid electrolyte particles without impairing the energy density.

For the negative electrode current collector, a material, which is electrochemically stable at a potential at which lithium (Li) is inserted into and extracted from the active material, for example, at a potential higher than 1.0 V (vs. $Li/Li^+$), is used. For example, the current collector is preferably made of copper, nickel, stainless steel or aluminum, or an aluminum alloy containing one or more elements selected from Mg, Ti, Zn, Hn, Fe, Cu and Si. A thickness of the current collector is preferably from 5 μm to 20 μm. With the current collector having such a thickness, the strength and weight reduction of the electrode can be well-balanced.

In addition, the negative electrode current collector may have a part on the surface of which the negative electrode active material-containing layer is not formed. This part can function as a negative electrode tab.

A specific surface area of the negative electrode is preferably within a range of 3 $m^2/g$ to 50 $m^2/g$. The specific surface area of the negative electrode means a surface area per 1 g of the negative electrode active material-containing layer (excluding the weight of the current collector). When the specific surface area is less than 3 $m^2/g$, the aggregation of particles is conspicuous, the affinity between the negative electrode and the electrolyte is lowered, and an interface resistance in the negative electrode is increased, so that output characteristics and charge-and-discharge cycle characteristics deteriorate. On the other hand, when the specific surface area exceeds 50 $m^2/g$, the distribution of the electrolyte is biased on the negative electrode, which causes the shortage of nonaqueous electrolyte on the positive electrode. Thus, it is difficult to improve the output characteristics and the charge-and-discharge cycle characteristics. A more preferable range of this specific surface area is from 5 $m^2/g$ to 50 $m^2/g$.

The density of the negative electrode active material-containing layer (excluding the current collector) is preferably 1.8 $g/cm^3$ to 2.9 $g/cm^3$. The negative electrode having the density of the negative electrode active material-containing layer within this range is excellent in energy density and electrolyte retentivity. The density of the negative electrode active material-containing layer is more preferably from 2.1 $g/cm^3$ to 2.8 $g/cm^3$.

Next, the case where the electrode according to the embodiment is the positive electrode will be described.

The positive electrode can include a positive electrode current collector and a positive electrode active material-containing layer. The positive electrode active material-containing layer can be formed on one side or both sides of the positive electrode current collector. The positive electrode active material-containing layer contains a positive electrode active material, ferroelectric particles, and solid electrolyte particles. The positive electrode active material-containing layer can arbitrarily contain a conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_yNi_{1-y-z}Co_yMn_zO_2$; $0<x\leq1$, $0<y<1$, $0<z<1$, y+z<1).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, y+z<1). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material particles may be, for example, in the form of primary particles or in the form of secondary particles obtained by aggregation of primary particles. The positive electrode active material particles may be a mixture of primary particles and secondary particles. In order to increase the number of the ferroelectric particles supported on surfaces of the primary particles, it is desirable that the mass of the primary particles accounting for the whole positive electrode active material particles is larger than the mass of the secondary particles.

An average primary particle size of the positive electrode active material is preferably from 100 nm to 5 µm. The positive electrode active material having a primary particle size of 100 nm or larger is easy to handle in terms of industrial production. The positive electrode active material having a primary particle size of 5 µm or smaller can cause the diffusion of lithium ions in the solid to smoothly progress. When the average primary particle size is within this range, it is possible to suppress the coverage rate of the ferroelectric particles on the surfaces of the active material particles from being excessively increased.

A BET specific surface area of the positive electrode active material is preferably from 0.1 $m^2/g$ to 10 $m^2/g$. Within this range, it is possible to suppress the coverage rate of the ferroelectric particles on the active material particle surface from being excessively increased. The positive electrode active material having the specific surface area of 0.1 $m^2/g$ or more can sufficiently secure sites for insertion and extraction of Li ions. The positive electrode active material having the specific surface area of 10 $m^2/g$ or less is easy to handle in terms of industrial production and can secure favorable charge-and-discharge cycle performance.

As the ferroelectric particles and the solid electrolyte particles contained in the positive electrode active material-containing layer, the same particles as those described in the description of the negative electrode can be used.

A conductive agent is added in order to increase the current-collecting performance and to suppress the contact resistance between the positive electrode active material and the positive electrode current collector. Examples of the conductive agent include carbonaceous materials such as vapor grown carbon fiber (VGCF), carbon black and graphite. An example of the carbon black include acetylene black. One of these materials may be used as the conductive agent, or two or more of these materials may be combined and used as the conductive agent. In addition, the conductive agent can be omitted.

A binder is added in order to fill a gap between dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compound, imide compound, carboxyl methyl cellulose (CMC), and salts of the CMC. One of these materials may be used as the binder, or two or more of these materials may be combined and used as the binder.

Mixing ratios of the positive electrode active material particles, the ferroelectric particles, the solid electrolyte particles, the conductive agent, and the binder in the positive electrode active material-containing layer are ratios of 70% by mass to 99% by mass, 0.1% by mass to 5% by mass, 0.1% by mass to 5% by mass, 0.1% by mass to 20% by mass, and 0.1% by mass to 10% by mass, respectively.

When the content of the ferroelectric particles is set within the above numerical range, it is possible to obtain the effect of alleviating the charge bias using the ferroelectric particles without impairing the energy density.

When the content of the solid electrolyte particles is set within the above numerical range, it is possible to obtain the effect of alleviating the charge bias using the solid electrolyte particles without impairing the energy density.

The positive electrode current collector is preferably an aluminum foil or an aluminum alloy foil containing one or more elements selected from Mg, Ti, Zn, Ni, Cr, Mn, Fe, Cu, and Si.

A thickness of the aluminum foil or the aluminum alloy foil is preferably from 5 µm to 20 µm, and more preferably from 5 µm to 15 µm. A purity of the aluminum foil is preferably 99% by mass or more. A content of transition metals such as iron, copper, nickel, and chromium contained in the aluminum foil or the aluminum alloy foil is preferably 1% by mass or less.

In addition, the positive electrode current collector may have a part on the surface of which the positive electrode active material-containing layer is not formed. This part can function as a positive electrode tab.

<Manufacturing Method>

A method of manufacturing the electrode according to the embodiment will be described.

First, ferroelectric particles are supported on surfaces of active material particles using an exemplary method to be described hereinafter. Unless supported in advance, the ferroelectric particles are relatively uniformly dispersed even though the ferroelectric particles are added into a slurry for forming an active material-containing layer, so that it is difficult to obtain the electrode according to the embodiment.

The active material particles and the ferroelectric particles are mixed in an aqueous solution containing carboxymethyl cellulose (CMC) at a weight of 1% to produce a mixed solution. The mixed solution thus obtained is applied on a Teflon (registered trademark) sheet and is dried for 40 hours under environment of 80° C., for example, thereby sufficiently removing moisture. In this manner, a composite active material powder in which the ferroelectric particle is supported on the surface of the active material particle is obtained.

It is possible to produce the electrode using the composite active material powder produced as described above by, for example, the following method. First, a slurry is prepared by suspending the composite active material powder, solid electrolyte particles, a conductive agent, and a binder in an appropriate solvent. The slurry is applied to one side or both sides of a current collector. Next, the applied slurry is dried to obtain a laminate of the active material-containing layer and the current collector. Thereafter, the laminate is pressed. In this manner, the electrode is produced.

As described above, when the composite active material powder, the solid electrolyte particles, the conductive agent, and the binder are simultaneously introduced into the solvent and dispersed, there is a possibility that some of the ferroelectric particles supported on the surfaces of the active material particles fall off from the surfaces of the active material particles. In this case, there is a possibility that the ratio ($FE_{contact}$) is not 85% or more.

Therefore, only the solid electrolyte particles, the conductive agent, and the binder are first suspended in the solvent to have high dispersibility at the time of preparing the above-described slurry, and then, the composite active material powder is dispersed into this dispersion liquid, whereby it is possible to suppress the ferroelectric particles supported on the surfaces of the active material particles from falling off from the active material particles. That is, it becomes easier to control the ratio ($FE_{contact}$) and the ratio ($SE_{non\text{-}contact}$) by manufacturing the electrode using this method. As a result, it is possible to obtain the electrode having the ratio ($FE_{contact}$) of 85% or more and the ratio ($SE_{non\text{-}contact}$) of 30% or more.

<Scanning Electron Microscope-Energy Dispersive X-Ray Spectroscopy (SEM-EDX)>

A description will be given regarding a method of obtaining an element mapping image by performing scanning electron microscope-energy dispersive X-ray spectroscopy (SEM-EDX) on a cross section of the electrode and a method of determining the ratio ($FE_{contact}$) and the ratio ($SE_{non\text{-}contact}$).

First, the secondary battery is set in a fully-discharged state. For example, the battery is repeatedly discharged a plurality of times 0.1 C current under an environment of 25° C. until a rated terminal voltage or a battery voltage reaches 1.0 V such that a current value at the time of discharging is 1/100 of the rated capacity or lower, whereby the battery can be set in the fully-discharged state. There is a case where there are lithium ions remaining even in the discharged state.

The secondary battery with the built-in electrode in the fully-discharged state (State of Charge: 0%) is disassembled in a glove box filled with argon. The electrode to be measured is taken out from the disassembled secondary battery. This electrode is washed with an appropriate solvent. For example, ethyl methyl carbonate or the like is preferably used as the solvent used for washing. If washing is insufficient, there is a case where it is difficult to observe particles due to the influence of lithium carbonate, lithium fluoride, or the like remaining in the electrode. The electrode to be measured, which has been taken out in this manner, is cut using an ion milling device. The electrode is cut along a thickness direction at the time of cutting the electrode. A cross section of the cut electrode is affixed to an SEM sample table. At this time, a conductive tape or the like is used to prevent the electrode from being peeled off or floating from the sample table. The electrode (active material-containing layer) affixed to the SEM sample table is observed by SEM to obtain an SEM image. At the time of SEM measurement, observation is performed with a magnification of 10,000 times. In addition, it is preferable to maintain the inert atmosphere at the time of introducing the electrode into a sample chamber.

Further, an element mapping image corresponding to the above-described SEM image is obtained by EDX. It is possible to confirm the presence or absence of active material particles, ferroelectric particles, and solid electrolyte particles contained in this active material-containing layer by considering the SEM image and the element mapping image in combination. In this manner, it is possible to visualize where each particle is distributed by performing the SEM-EDX analysis.

With respect to the total length in a longitudinal direction of the cross section of the active material-containing layer, five points are selected at equal intervals in the longitudinal direction from a position spaced apart from an end at an interval of 20% or more, and the above-described SEM-EDX analysis is performed for these five points. Then, a ratio of the number of the ferroelectric particles in contact with active material particles relative to the number of all the ferroelectric particles present within the scope of the field of view is calculated as a percentage for each of the five points. Thereafter, an average value of the five calculated values is calculated. The average value calculated in this manner is regarded as the ratio ($FE_{contact}$) of the number of the ferroelectric particles in contact with the active material particles relative to the whole number of the ferroelectric particles contained in the active material-containing layer.

In addition, a ratio of the number of the solid electrolyte particles not in contact with the active material particles relative to the number of all the solid electrolyte particles present in the scope of the field of view is calculated as a percentage for each of the above five points. Thereafter, an average value of the five calculated values is calculated. The average value calculated in this manner is regarded as the ratio ($SE_{non\text{-}contact}$) of the number of the solid electrolyte particles not in contact with the active material particles relative to the whole number of the solid electrolyte particles contained in the active material-containing layer.

<Inductively Coupled Plasma (ICP)>

Each composition of the active material particle, the ferroelectric particle, and the solid electrolyte particle contained in the active material-containing layer can be confirmed by emission spectrometry using inductively coupled plasma (ICP) as a light source.

With ICP, a metal composition ratio of inorganic compound particles contained in the electrode can be investigated. The ICP measurement is performed as follows. First, the electrode is removed from the secondary battery and washed according to the procedure that has been described in the section of SEM-EDX. The washed electrode is put in an appropriate solvent, and the resultant is irradiated with ultrasonic waves. For example, the electrode is put in ethyl methyl carbonate prepared in a glass beaker and is vibrated in an ultrasonic washer. In this manner, the electrode can be peeled off from a current collector. Next, reduced-pressure drying is performed to dry the peeled-off electrode. The obtained electrode is pulverised using a mortar or the like to form a powder to be measured that contains the active material particles, the ferroelectric particles, the solid electrolyte particles, the conductive agent, the binder, and the like. Then, 0.05 g of this mixture is put into a Teflon (registered trademark) container, 8 mL of aqua regia is added, and the resultant is subjected to microwave heating to uniformly dissolve. It is possible to prepare a liquid sample containing the respective components through dissolving. Ultrapure water is added to this solution to be 100 g, and the resultant is used as an ICP measurement sample. It is possible to know the composition of the electrode by conducting measurement and analysis on this IC measurement sample under the following conditions using an ICP-emission spectroscopic analyzer.

(Measurement Conditions of ICP-Emission Spectroscopic Analyzer)

A cyclone chamber for a water solvent is used, and it is set such that a plasma gas (PL1): 13 (L/min), a sheath gas (G1): 0.3 (L/min), a nebulizer gas pressure: 3.0 (bar), a nebulizer flow rate: 0.2 (L/min), and high frequency power: 1.0 (kw).

Quantitative values are calculated by comparing obtained results with analytical values of commercially-available standard solutions for atomic absorption analysis.

<Measurement of Ion Conductivity of Solid Electrolyte Particle>

The lithium ion conductivity of the solid electrolyte particle is calculated as follows.

200 mg of solid electrolyte particles having the same composition as the solid electrolyte identified by the SEM-EDX and ICP analysis are compact-molded into a cylindrical shape having a diameter of 10 mm. This green compact is subjected to heat treatment at a temperature of 1100° C. for 5 hours to obtain a tablet-shaped inorganic compound. Gold is vapor-deposited on surfaces of both sides of the obtained tablet-shaped inorganic compound using gold sputtering, and a lithium ion conductivity ($\sigma$) is measured. An AC impedance method is used as a measurement method. A bulk resistance R ($\Omega$) at room temperature is estimated based on the measured arc, a thickness of the tablet-shaped inorganic compound is measured using a vernier caliper, and the thickness is set to L (cm) and a sectional area is set to S (cm$^2$). Using the obtained values, the lithium ion conductivity $\sigma$ (S/cm) is calculated according to the following formulas.

$$\rho = R \times S/L \quad \text{[Equation 1]}$$

$$\sigma = 1/\rho \quad \text{[Equation 2]}$$

<Measurement of Relative Permittivity of Ferroelectric Particle>

Measurement is performed by an impedance meter method using an inductance capacitance resistance (LCR) meter. A sample having the same composition as the ferroelectric particle identified by the SEM-EDX and ICP analysis is sandwiched between parallel flat ITO electrode-attached glass substrates opposing each other with an electrode interval of 30 μm. Thereafter, an equivalent parallel capacitance when a test signal voltage of 0.1 V is applied at room temperature (25° C.) and a measurement frequency (1 kHz) is measured, and the relative permittivity is determined by calculation according to the following formula.

Relative Permittivity=Equivalent Parallel Capacitance×Electrode Interval/Electrode Area/Vacuum Permittivity ($\varepsilon 0$)

An electrode is provided according to the first embodiment. The electrode includes an active material-containing layer containing active material particles, ferroelectric particles, and solid electrolyte particles having a Li ion conductivity of $1 \times 10^{-10}$ S/cm or more at 25° C. A ratio ($FE_{contact}$) of the number of the ferroelectric particles in contact with the active material particles relative to the number of the ferroelectric particles included in the active material-containing layer is 85% or more. A ratio ($SE_{non-contact}$) of the number of the solid electrolyte particles not in contact with the active material particles relative to the number of the solid electrolyte particles included in the active material-containing layer is 30% or more. The electrode can realize the secondary battery excellent in input/output characteristics and energy density.

Second Embodiment

According to a second embodiment, a secondary battery including a negative electrode, a positive electrode, and an electrolyte is provided. At least one of the negative electrode and the positive electrode is the electrode according to the first embodiment.

The secondary battery may further include a separator provided between the positive electrode and the negative electrode. The negative electrode, the positive electrode, and the separator can constitute an electrode group. The electrolyte may be held in the electrode group. The secondary battery may further include a container member that houses the electrode group and the electrolyte. The secondary battery may further include a negative electrode terminal electrically connected to the negative electrode and a positive electrode terminal electrically connected to the positive electrode.

The secondary battery may be, for example, a lithium ion secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode included in the secondary battery according to the second embodiment may be, for example, the negative electrode described in the first embodiment. When the positive electrode is an electrode corresponding to that of the first embodiment, the negative electrode does not necessarily contain the ferroelectric particles and solid electrolyte particles described in the first embodiment.

(2) Positive Electrode

The positive electrode included in the secondary battery according to the second embodiment may be, for example, the positive electrode described in the first embodiment. When the negative electrode is an electrode corresponding to that of the first embodiment, the positive electrode does not necessarily contain the ferroelectric particles and solid electrolyte particles described in the first embodiment.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by weight or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. $Li/Li^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be described in detail with reference to the drawings.

Figure 2:
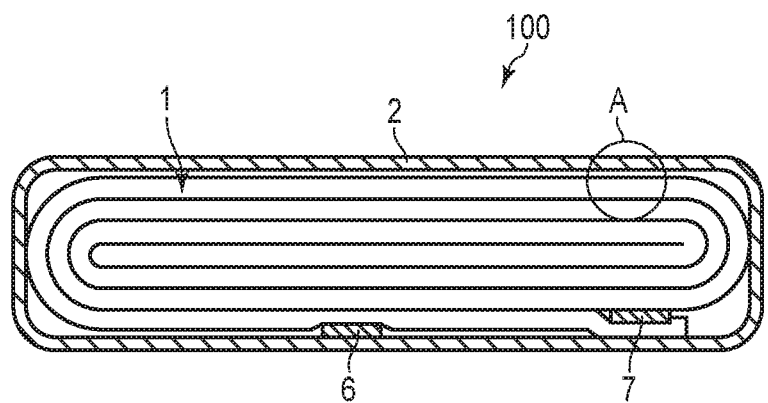
FIG. 2 is a sectional view schematically illustrating an example of a secondary battery according to a second embodiment.
Figure 3:
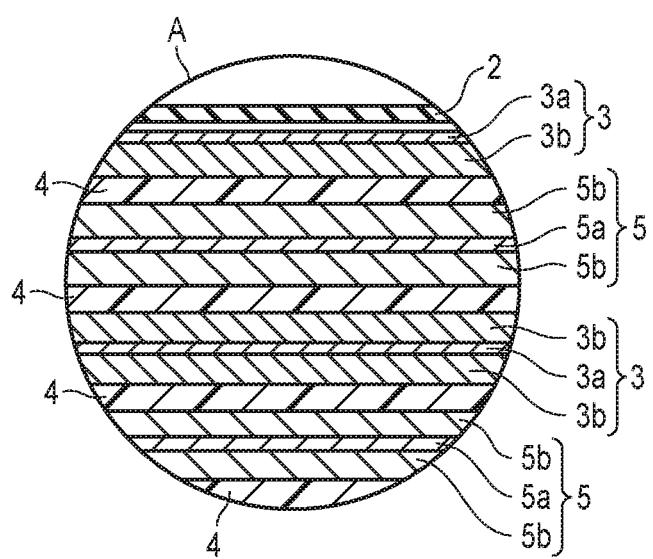
FIG. 3 is an enlarged sectional view of a portion A of the secondary battery illustrated in FIG. 2.

FIG. 2 is a sectional view schematically showing an example of a secondary battery according to an embodiment. FIG. 3 is an enlarged sectional view of a portion A of the secondary battery shown in FIG. 2.

The secondary battery 100 shown in FIG. 2 and FIG. 3 includes a bag-shaped container member 2 shown in FIG. 2, an electrode group 1 shown in FIG. 2 and FIG. 3, and an aqueous electrolyte (not shown). The electrode group 1 and the aqueous electrolyte are stored in the bag-shaped container member 2. The aqueous electrolyte (not shown) is held in the electrode group 1.

The bag-shaped container member 2 is formed from a laminate film including two resin layers and a metal layer disposed therebetween.

As shown in FIG. 2, the electrode group 1 is a flat wound electrode group. The flat wound electrode group 1 includes negative electrodes 3, separators 4, and positive electrodes 5 as shown in FIG. 3. The separator 4 is disposed between the negative electrode 3 and the positive electrode 5.

The negative electrode 3 includes a negative electrode current collector 3a and negative electrode active material-containing layers 3b. In the portion of the negative electrode 3 located at the outermost shell of the wound electrode group 1, the negative electrode active material-containing layer 3b is formed only on the inside surface side of the negative electrode current collector 3a, as shown in FIG. 3. In another portion of the negative electrode 3, the negative electrode active material-containing layer 3b is formed on both sides of the negative electrode current collector 3a.

The positive electrode 5 includes a positive electrode current collector 5a and positive electrode active material-containing layers 5b formed on both sides thereof.

As shown in FIG. 2, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the openings are closed by thermal fusion bonding of the thermoplastic resin layer.

Figure 4:
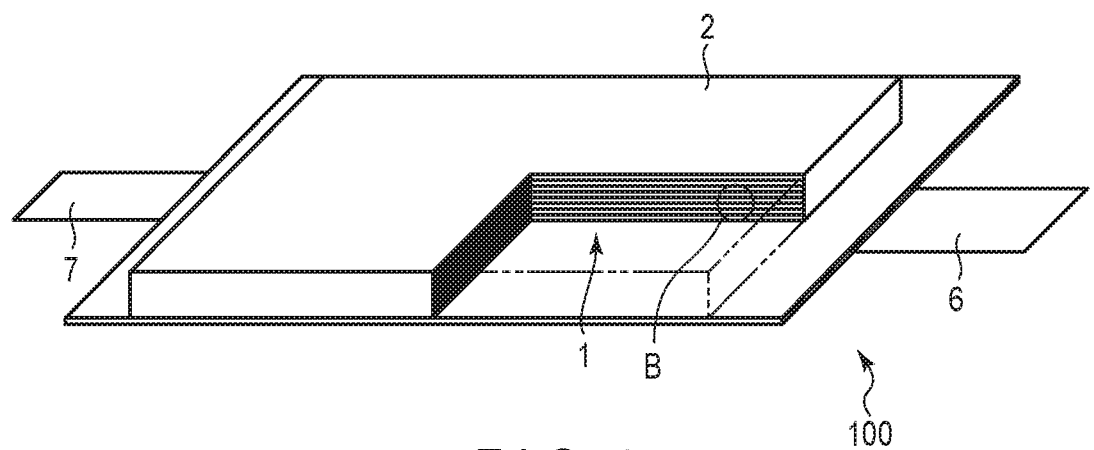
FIG. 4 is a partially cut-away sectional perspective view schematically illustrating another example of the secondary battery according to the second embodiment.
Figure 5:
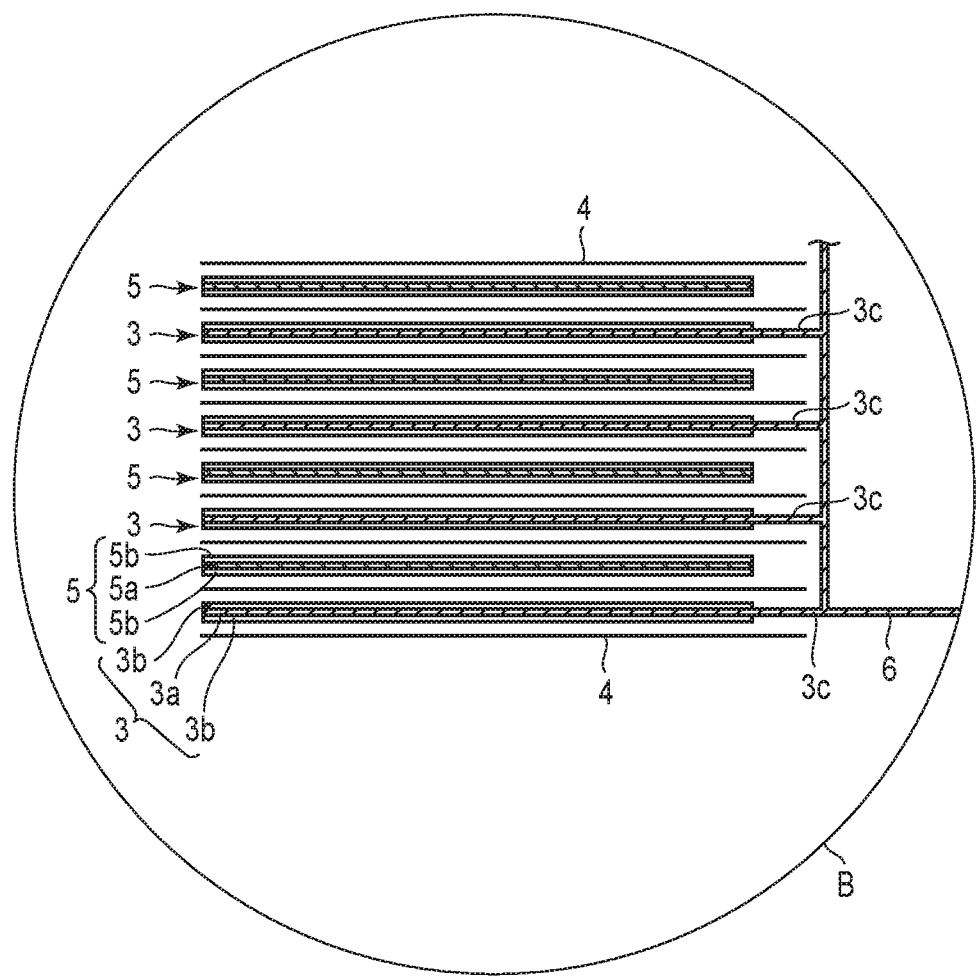
FIG. 5 is an enlarged sectional view of a portion B of the secondary battery illustrated in FIG. 4.

The secondary battery according to the embodiment is not limited to the secondary battery having the structure shown in FIGS. 2 and 3, and may be, for example, a battery having a structure shown in FIGS. 4 and 5.

FIG. 4 is a partial cut-away sectional perspective view schematically showing another example of the secondary battery according to the second embodiment. FIG. 5 is an enlarged sectional view of a portion B of the secondary battery shown in FIG. 4.

The secondary battery 100 shown in FIGS. 4 and 5 includes an electrode group 1 shown in FIGS. 4 and 5, a container member 2 shown in FIG. 4, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 5, the electrode group 1 is a laminated electrode group. The laminated electrode group 1 has a structure in which a negative electrode 3 and a positive electrode 5 are alternately laminated with a separator 4 intervening therebetween.

The electrode group 1 includes plural of negative electrodes 3. Each of the negative electrodes 3 includes a negative electrode current collector 3a and a negative electrode active material-containing layer 3b carried on both surfaces of the negative electrode current collector 3a. In addition, the electrode group 1 includes plural of positive electrodes 5. Each of the positive electrodes 5 includes a positive electrode current collector 5a and a positive electrode active material-containing layer 5b carried on both surfaces of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode current collector tab. As shown in FIG. 5, the portion 3c acting as the negative electrode current collector tab does not overlap the positive electrode 5. In addition, plural of negative electrode current collector tabs (portion 3c) are electrically connected to the belt-shaped negative electrode terminal 6. A tip of the belt-shaped negative electrode terminal 6 is drawn outward from the container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to the belt-shaped positive electrode terminal 7. A tip of the belt-shaped positive electrode terminal 7 is positioned on the opposite side to the negative electrode terminal 6 and is drawn outward from the container member 2.

The secondary battery according to the embodiment may constitute a battery module. The battery module may include plural of secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

Figure 6:
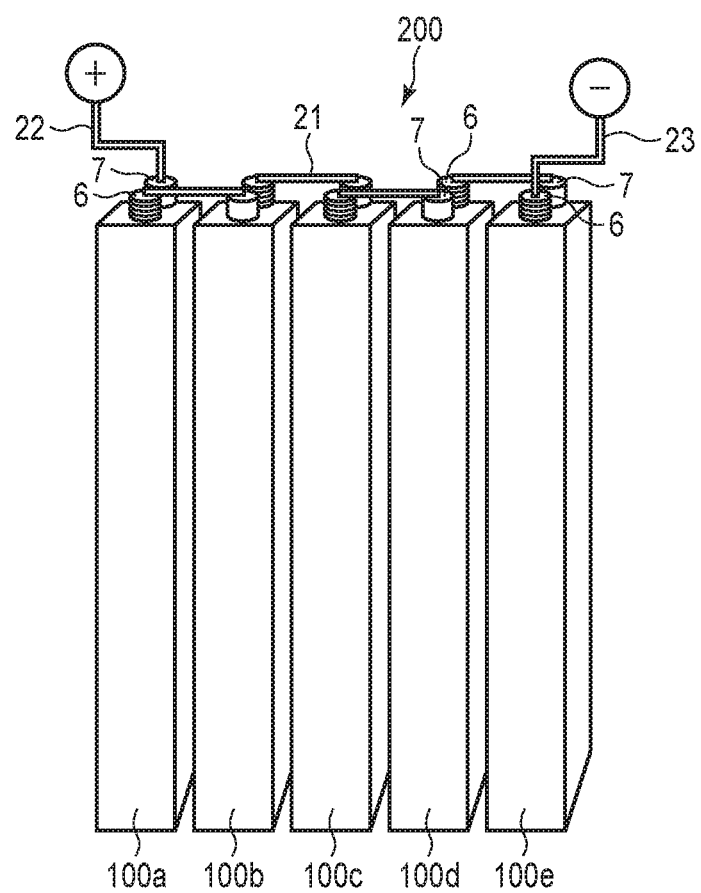
FIG. 6 is a perspective view schematically illustrating an example of a battery module according to the second embodiment.

FIG. 6 is a perspective view schematically showing an example of the battery module according to the embodiment. The battery module 200 shown in FIG. 6 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 6 is a battery module of five in-series connection.

As shown in FIG. 6, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100a to 100e is connected to the negative electrode-side lead 23 for external connection.

The secondary battery according to the second embodiment includes the negative electrode, the positive electrode, and the electrolyte. At least one of the negative electrode and the positive electrode is the electrode according to the first embodiment. Therefore, the secondary battery is excellent in input/output characteristics and energy density.

Third Embodiment

According to a third embodiment, a battery pack is provided. The battery pack includes the secondary battery according to the second embodiment. The battery pack includes one secondary battery according to the second embodiment, or may include a battery module with plural of secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 7:
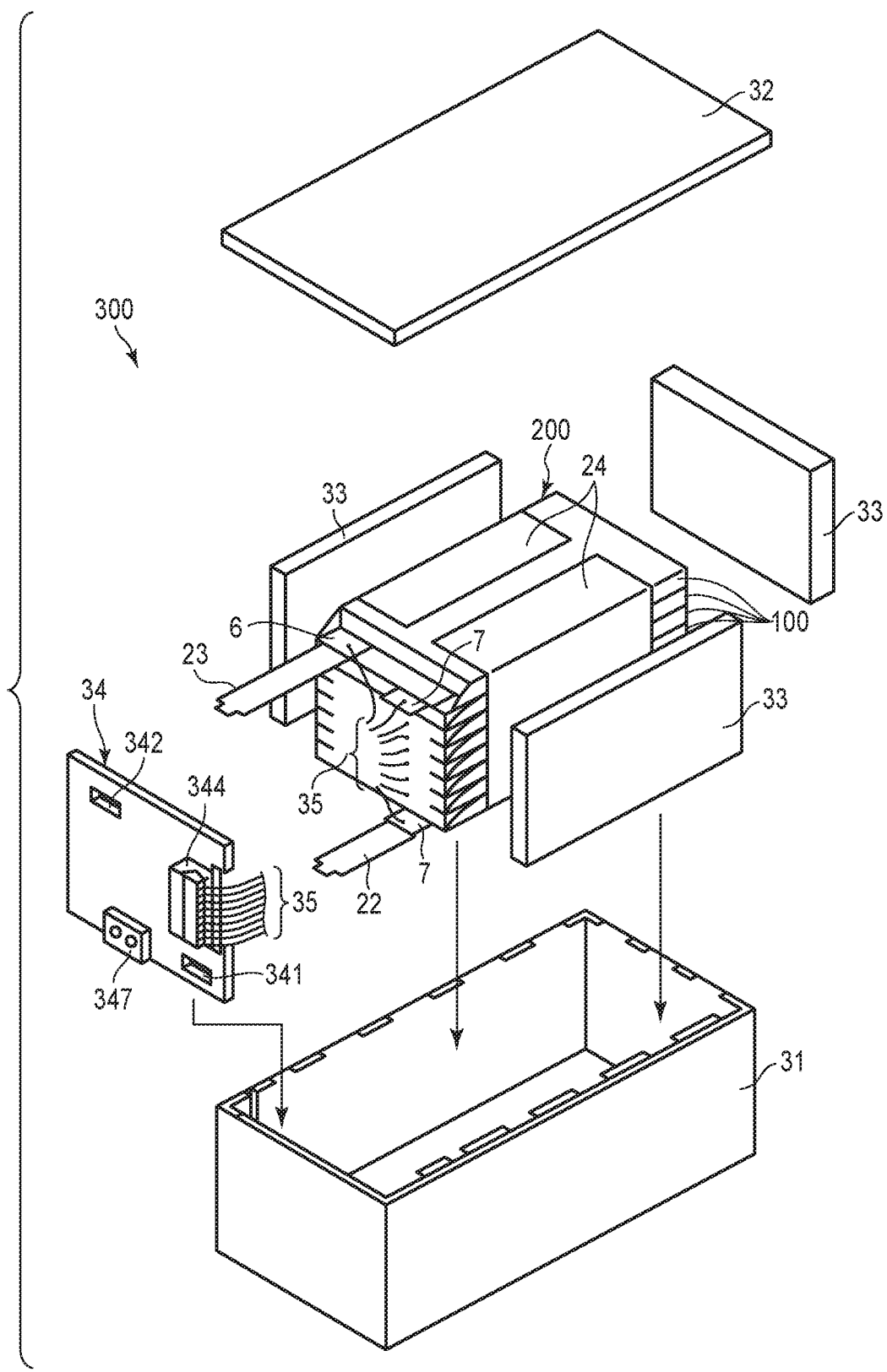
FIG. 7 is a perspective view schematically illustrating an example of a battery pack according to a third embodiment.
Figure 8:
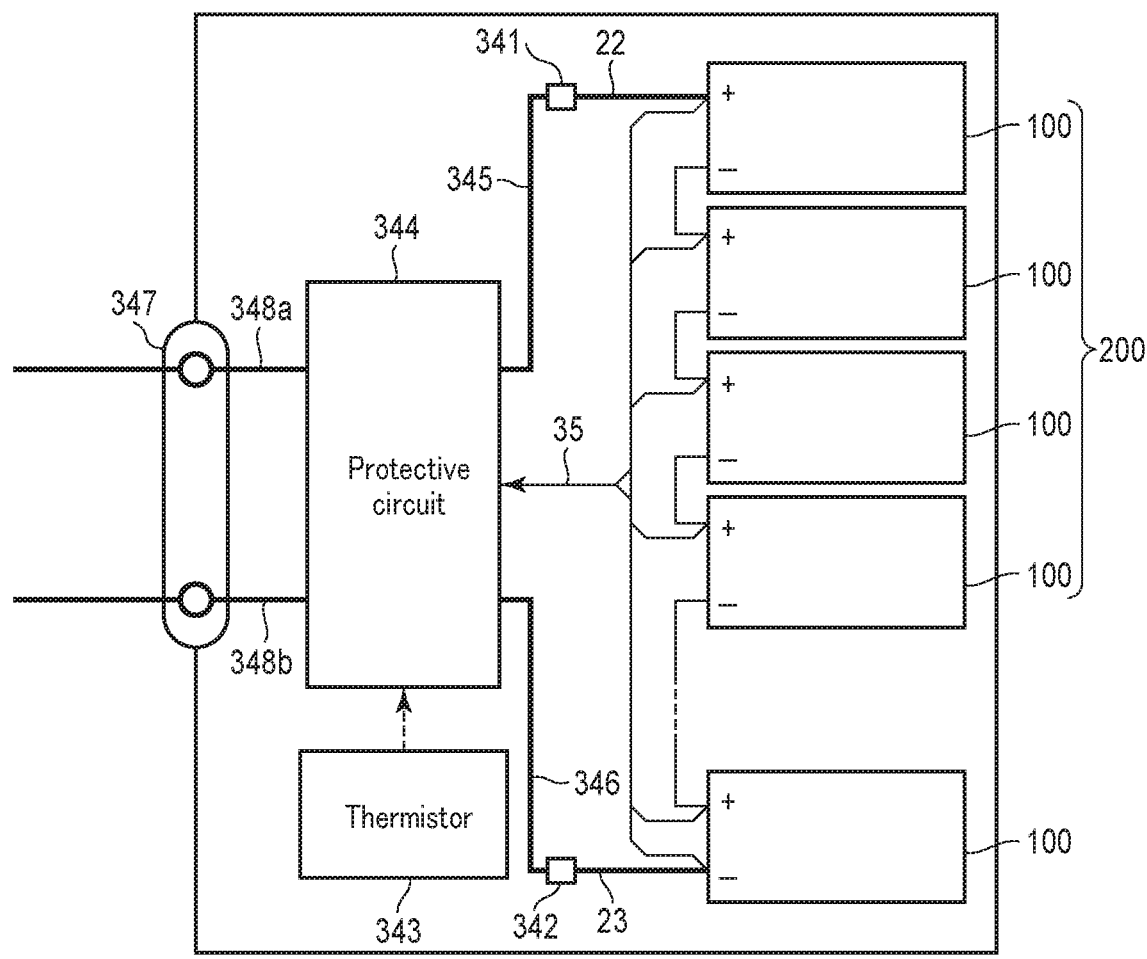
FIG. 8 is a block diagram illustrating an example of an electric circuit of the battery pack illustrated in FIG. 7.

FIG. 7 is an exploded perspective view schematically showing an example of the battery pack according to the embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

A housing container 31 shown in FIG. 7 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

The unit cell 100 has, for example, a structure shown in FIGS. 2 and 3. At least one of the plural unit cells 100 is a secondary battery according to the second embodiment. The plural unit cells 100 are stacked such that the negative electrode terminals 6 and the positive electrode terminals 7, which extend outside, are directed toward the same direction. The plural unit cells 100 are electrically connected in series, as shown in FIG. 8. The plural unit cells 100 may alternatively be electrically connected in parallel, or connected in a combination of in-series connection and in-parallel connection. If the plural unit cells 100 are connected in parallel, the battery capacity increases as compared to a case in which they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One end of the positive electrode-side lead 22 is connected to the positive electrode terminal 7 of the unit cell 100 located lowermost in the stack of the unit cells 100. One end of the negative electrode-side lead 23 is connected to the negative electrode terminal 6 of the unit cell 100 located uppermost in the stack of the unit cells 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each unit cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 349a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural unit cells 100. The protective circuit 344 is also configured to cut-off electric connection between the protective circuit 344 and the external power distribution terminal 347, based on detection signals transmitted from the thermistor 343 or detection signals transmitted from each unit cell 100 or the battery module 200.

An example of the detection signal transmitted from the thermistor 343 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment includes the secondary battery according to the second embodiment. Therefore, the battery pack is excellent in input/output characteristics and energy density.

Fourth Embodiment

According to a fourth embodiment, a vehicle is provided. The vehicle includes the battery pack according to the third embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist, bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

Figure 9:
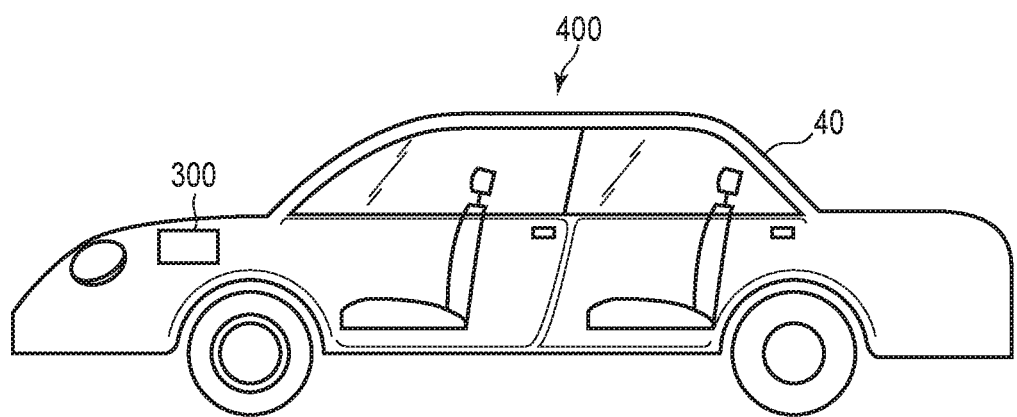
FIG. 9 is a sectional view schematically illustrating an example of a vehicle according to a fourth embodiment.

FIG. 9 is a sectional view schematically showing an example of a vehicle according to the embodiment.

The vehicle 400 shown in FIG. 9 includes a vehicle body 40 and a battery pack 300 according to the third embodiment. The vehicle 400 shown in FIG. 9 is a four-wheel automobile.

This vehicle 400 may have plural battery packs 300 installed. In such a case, the battery packs 300 may be connected in series, connected in parallel, or connected in a combination of in-series connection and in-parallel connection.

In FIG. 9, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Figure 10:
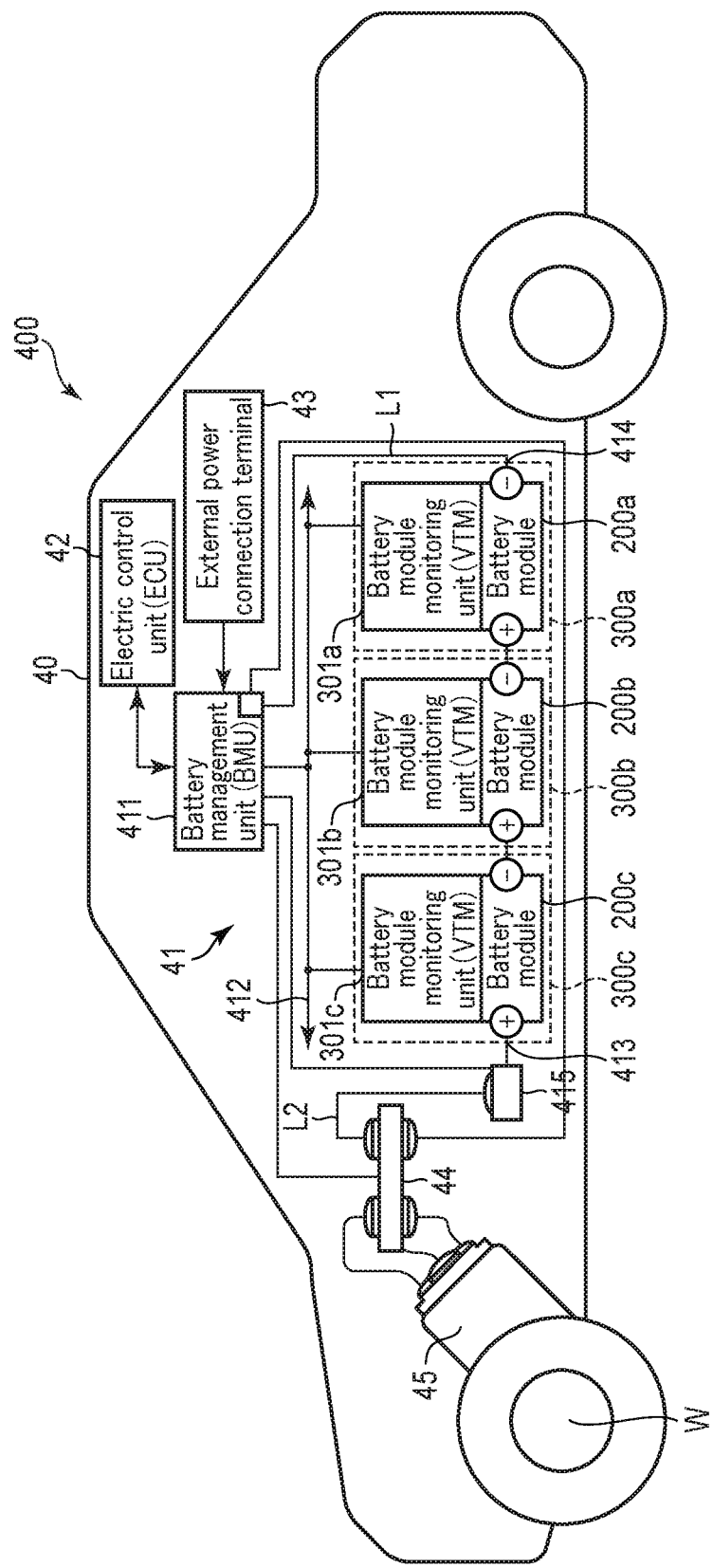
FIG. 10 is a view schematically illustrating another example of the vehicle according to the fourth embodiment.

Next, with reference to FIG. 10, an aspect of operation of the vehicle according to the embodiment is explained.

FIG. 10 is a view schematically showing an example of the vehicle according to the embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (for example, VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 10) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted, for example, into the battery pack included the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fourth embodiment includes the battery pack according to the third embodiment. Therefore, it is possible to provide the vehicle including the battery pack excellent in input/output characteristics and energy density according to the present embodiment.

EXAMPLES

Although Examples will be described hereinafter, the embodiments are not limited to Examples to be described hereinafter.

Example 1

In Example 1, in order to investigate the performance of a battery containing ferroelectric particles and solid electrolyte particles, an electrode body including a composite positive electrode/an electrolyte/a negative electrode was produced. A positive electrode containing ferroelectric particles and solid electrolyte particles is called the composite positive electrode. In addition, a negative electrode containing ferroelectric particles and solid electrolyte particles is called a composite negative electrode.

<Production of Positive Electrode>

First, a mixed solution of a composite oxide of $LiNi_{0.5}Co_{0.2}Mn_{0.3}O_2$ having an average particle size of primary particles of 2 μm as a positive electrode active material, an aqueous solution containing carboxymethyl cellulose (CMC) at a weight of 1%, and barium titanate ($BaTiO_3$) having an average particle size of primary particles of 0.05 μm as ferroelectric particles is produced. A content of the ferroelectric particles in this mixed solution was 1 part by weight based on 100 parts by weight of the active material particles. The mixed solution thus obtained was applied on a Teflon (registered trademark) sheet and was dried for 40 hours under an environment of 80° C. to sufficiently remove moisture, thereby producing a composite positive electrode active material powder. The obtained composite positive electrode active material powder, an LATP ($Li_{1.5}Al_{1.5}(PO_4)_3$) powder having an average particle size of primary particles of 1 μm as the solid electrolyte particles, a graphite powder as a conductive agent, polyvinylidene fluoride (PVdF) as a binder were prepared. The composite positive electrode active material powder, the solid electrolyte particles, the conductive agent, and the binder were compounded in ratios of 91% by weight, 2% by weight, 4% by weight, and 3% by weight, respectively, relative to the entire positive electrode and were dispersed in an N-methyl-2-pyrrolidone (NMP) solvent to prepare a slurry. This slurry was applied to one side of an aluminum alloy foil (purity 99%) having a thickness of 15 μm, and the coating film was dried to obtain a laminate formed of a current collector and an active material-containing layer. This laminate was pressed to produce the composite positive electrode having a thickness of the active material-containing layer of 40 μm and an electrode density of 3.2 g/cm$^3$.

<Production of Negative Electrode>

A $Li_4Ti_5O_{12}$ powder having an average particle size of 0.6 μm as a negative electrode active material and having a specific surface area of 10 m$^2$/g, graphite powder as a conductive agent, and PVdF as a binder were prepared. The negative electrode active material, the conductive agent, and the binder were compounded in ratios of 94% by weight, 4% by weight, and 2% by weight, respectively, and were dispersed in an NMP solvent to prepare a slurry. The obtained slurry was applied to one side of an aluminum alloy foil (purity 99%) having a thickness of 15 μm, and the coating film was dried to obtain a laminate formed of a current collector and an active material-containing layer. This laminate was pressed to produce the negative electrode having a thickness of the active material-containing layer of 59 μm and an electrode density of 2.2 g/cm$^3$.

<Preparation of Electrolyte>

Propylene carbonate and diethyl carbonate were mixed at a volume ratio of 1:2 to prepare a mixed solvent. A nonaqueous electrolyte was prepared by dissolving LiPF$_6$ at a concentration of 1.2 M in this mixed solvent.

<Production of Secondary Battery>

The composite positive electrode obtained as described above, a separator which is a nonwoven fabric having a thickness of 20 μm, and the negative electrode were laminated such that the active material-containing layer of the composite positive electrode and the active material-containing layer of the negative electrode face each other to obtain a laminate. Next, this laminate was spirally wound to make the negative electrode positioned at the outermost periphery, thereby producing an electrode group. This was heated and pressed at 90° C. to produce a flat-type electrode group. The obtained electrode group was housed in a thin metal can formed from stainless steel having a thickness of 0.25 mm. Incidentally, a valve for leaking a gas when the internal pressure became 2 atm or more was installed at the metal can. An electrolyte was injected into the metal can to produce a secondary battery.

Example 2

A secondary battery was produced using the same method as in Example 1, except that an LATP (Li$_{1.5}$AlTi$_{1.5}$(PO$_4$)$_3$) powder having an average particle size of primary particles of 5 μm was used as solid electrolyte particles.

Example 3

A secondary battery was produced using the same method as in Example 1, except that an LATP (Li$_{1.5}$AlTi$_{1.5}$(PO$_4$)$_3$) powder having an average particle size of primary particles of 0.1 μm was used as solid electrolyte particles.

Example 4

A secondary battery was produced using the same method as in Example 1, except that an LATP (Li$_{1.5}$AlTi$_{1.5}$(PO$_4$)$_3$) powder having an average particle size of primary particles of 0.5 μm was used as solid electrolyte particles.

Example 5

A secondary battery was produced using the same method as in Example 1, except that barium titanate (BaTiO$_3$) having an average particle size of primary particles of 0.001 μm was used as ferroelectric particles.

Example 6

A secondary battery was produced using the same method as in Example 1, except that barium titanate (BaTiO$_3$) having an average particle size of primary particles of 0.01 μm was used as ferroelectric particles.

Example 7

A secondary battery was produced using the same method as in Example 1, except that barium titanate (BaTiO$_3$) having an average particle size of primary particles of 0.1 μm was used as ferroelectric particles.

Example 8

A secondary battery was produced using the same method as in Example 1, except that an LZCP (Li$_{1.2}$Zr$_{1.9}$Ca$_{0.1}$(PO$_4$)$_3$) powder having an average particle size of primary particles of 1 μm was used as solid electrolyte particles.

Example 9

A secondary battery was produced using the same method as in Example 1, except that an LLZ (Li$_7$La$_3$Zr$_2$O$_{12}$) powder having an average particle size of primary particles of 1 μm was used as solid electrolyte particles.

Example 10

A secondary battery was produced using the same method as in Example 1, except that an LLT (Li$_{0.5}$La$_{0.5}$TiO$_3$) powder having an average particle size of primary particles of 1 μm was used as solid electrolyte particles.

Example 11

A secondary battery was produced using the same method as in Example 1, except that zirconium dioxide (ZrO$_2$) having an average particle size of primary particles of 0.05 μm was used as ferroelectric particles.

Example 12

A secondary battery was produced using the same method as in Example 1, except that titanium dioxide (TiO$_2$) having an average particle size of primary particles of 0.05 μm was used as ferroelectric particles.

Example 13

A secondary battery was produced using the same method as in Example 1, except that aluminum oxide (Al$_2$O$_3$) having an average particle size of primary particles of 0.05 μm was used as ferroelectric particles.

Example 14

A secondary battery was produced using the same method as in Example 1, except that the composite negative electrode was produced instead of the composite positive electrode was produced.

When producing the positive electrode of Example 14, mixing ratios of a positive electrode active material, a conductive agent, and a binder were 93% by weight, 4% by weight, and 3% by weight, respectively, relative to the entire positive electrode.

When producing the negative electrode of Example 14, mixing ratios of a negative electrode active material, solid electrolyte particles, ferroelectric particles, a conductive agent, and a binder were 88% by weight, 2% by weight, 1% by weight, 6% by weight, and 3% by weight, respectively, relative to the entire negative electrode.

Example 15

A secondary battery was produced using the same method as in Example 14, except that an LZCP (Li$_{1.2}$Zr$_{1.9}$Ca$_{0.1}$ ($PO_4$)$_3$) powder having an average particle size of primary particles of 1 μm was used as solid electrolyte particles.

Example 16

A secondary battery was produced using the same method as in Example 14, except that aluminum oxide ($Al_2O_3$) having an average particle size of primary particles of 0.05 μm was used as ferroelectric particles.

Example 17

A secondary battery was produced using the same method as in Example 1, except that a gel electrolyte produced in the following manner was used as an electrolyte instead of an electrolyte solution.

An electrode layer and a separator were impregnated with a mixture solution of a mixed solvent of propylene carbonate (PC) and diethyl carbonate (volume ratio of 1:2) in which $LiPF_6$ was dissolved at a concentration of 1 M and a solution of a polymer of polyacrylonitrile (2% by weight). Thereafter, the cell was sealed in order to prevent entry of moisture, and the mixture solution was gelled by heating at 60° C. for 25 hours.

Example 18

A secondary battery was produced using the same method as in Example 14, except that the gel electrolyte was used as an electrolyte.

Example 19

A secondary battery was produced using the same method as in Example 1, except that $LiNi_{0.6}Co_{0.2}Mn_{0.2}O_2$ having an average particle size of primary particles of 1 μm was used as a positive electrode active material.

Example 20

A secondary battery was produced using the same method as in Example 1, except that $LiNi_{0.8}Co_{0.1}Mn_{0.1}O_2$ having an average particle size of primary particles of 1 μm was used as a positive electrode active material.

Example 21

A secondary battery was produced using the same method as in Example 1, except that $LiMn_2O_4$ having an average particle size of primary particles of 2 μm was used as a positive electrode active material.

Example 22

A secondary battery was produced using the same method as in Example 1, except that $LiFe_{0.2}Mn_{0.8}PO_4$ having an olivine structure with an average particle size of primary particles of 0.2 μm was used as a positive electrode active material.

Example 23

A secondary battery was produced using the same method as in Example 1, except that the composite negative electrode produced using the same method as in Example 14 was used as a negative electrode. That is, both of the positive electrode and the negative electrode used in Example 23 were compounded.

Example 24

A secondary battery was produced using the same method as in Example 1, except that the composite positive electrode produced using the same method as in Example 8 and a composite negative electrode produced using the same method as in Example 15 were used.

Example 25

A secondary battery was produced using the same method as in Example 1, except that $Nb_2TiO_7$ having an average particle size of 2 μm and a specific surface area of 2 $m^2$/g was used as a negative electrode active material.

Example 26

A secondary battery was produced using the same method as in Example 25, except that an LZCP ($Li_{1.2}Zr_{1.9}Ca_{0.1}$($PO_4$)$_3$) powder having an average particle size of primary particles of 1 μm was used as solid electrolyte particles.

Example 27

A secondary battery was produced using the same method as in Example 14, except that $Nb_2TiO_7$ having an average particle size of 2 μm and a specific surface area of 2 $m^2$/g was used as a negative electrode active material.

Example 28

A secondary battery was produced using the same method as in Example 27, except that an LZCP ($Li_{1.2}Zr_{1.9}Ca_{0.1}$($PO_4$)$_3$) powder having an average particle size of primary particles of 1 μm was used as solid electrolyte particles.

Example 29

A secondary battery was produced using the same method as in Example 23, except that $Nb_2TiO_7$ having an average particle size of 2 μm and a specific surface area of 2 $m^2$/g was used as a negative electrode active material.

Example 30

A secondary battery was produced using the same method as in Example 29, except that an LZCP ($Li_{1.2}Zr_{1.9}Ca_{0.1}$($PO_4$)$_3$) powder having an average particle size of primary particles of 1 μm was used as solid electrolyte particles.

Example 31

A secondary battery was produced using the same method as in Example 17, except that $Nb_2TiO_7$ having an average particle size of 2 μm and a specific surface area of 2 $m^2$/g was used as a negative electrode active material.

Example 32

A secondary battery was produced using the same method as in Example 18, except that $Nb_2TiO_7$ having an average particle size of 2 μm and a specific surface area of 2 $m^2$/g was used as a negative electrode active material.

Example 33

A secondary battery was produced using the same method as in Example 18, except that a sodium niobium titanium composite oxide ($Li_2Na_{1.8}Ti_{5.8}Nb_{0.2}O_{14}$) having an average particle size of 2 μm and a specific surface area of 8 $m^2/g$ was used as a negative electrode active material.

Comparative Example 1

A composite oxide of $LiNi_{0.5}Co_{0.2}Mn_{0.3}O_2$ having an average particle size of primary particles of 2 μm as a positive electrode active material, an LATP ($Li_{1.5}AlTi_{1.5}(PO_4)_3$) powder having an average particle size of primary particles of 1 μm as solid electrolyte particles, barium titanate ($BaTiO_3$) having an average particle size of primary particles of 0.05 μm as ferroelectric particles, a graphite powder as a conductive agent, and polyvinylidene fluoride (PVdF) as a binder were prepared. A secondary battery was produced using the same method as in Example 1, except that the positive electrode active material, the solid electrolyte particles, the ferroelectric particles, the conductive agent, and the binder were compounded in ratios of 90% by weight, 2% by weight, 1% by weight, 4% by weight, and 3% by weight, respectively, relative to the entire positive electrode and were dispersed in an N-methyl-2-pyrrolidone (NMP) solvent to prepare a slurry.

Comparative Example 2

A secondary battery was produced using the same method as in Example 1, except that a positive electrode active material powder, solid electrolyte particles, ferroelectric particles, a conductive agent, and a binder were compounded in ratios of 81% by weight, 2% by weight, 10% by weight, 4% by weight, and 3% by weight, respectively.

Comparative Example 3

A secondary battery was produced using the same method as in Example 1, except that a positive electrode active material powder, solid electrolyte particles, ferroelectric particles, a conductive agent, and a binder were compounded in ratios of 82% by weight, 10% by weight, 1% by weight, 4% by weight, and 3% by weight, respectively.

Comparative Example 4

A secondary battery was produced using the same method as in Example 1, except for not using ferroelectric particles.

Comparative Example 5

A secondary battery was produced using the same method as in Example 1, except for not using solid electrolyte particles.

<Calculation of Ratio ($FE_{contact}$) and Ratio ($SE_{non-contact}$)>

According to the method described in the first embodiment, SEM-EDX was performed on the positive electrode and negative electrode compounded in each example, and a ratio ($FE_{contact}$) and a ratio ($SE_{non-contact}$) were calculated based on obtained SEM image and element mapping image.

Figure 11:
FIG. 11 illustrates a scanning electron microscope (SEM) image according to Example 1.
Figure 12:
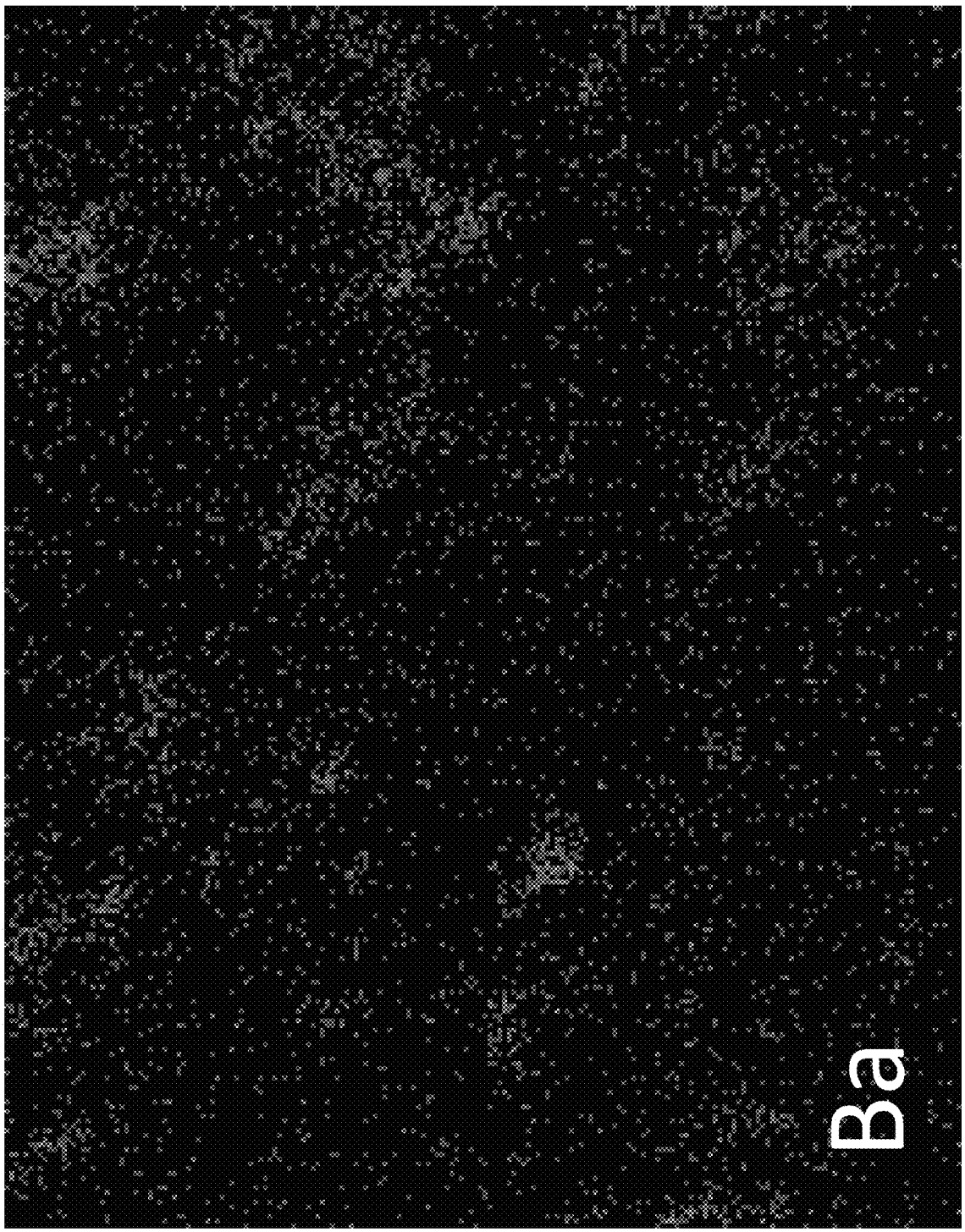
FIG. 12 is an element mapping image of Ba corresponding to the SEM image illustrated in FIG. 11.
Figure 13:
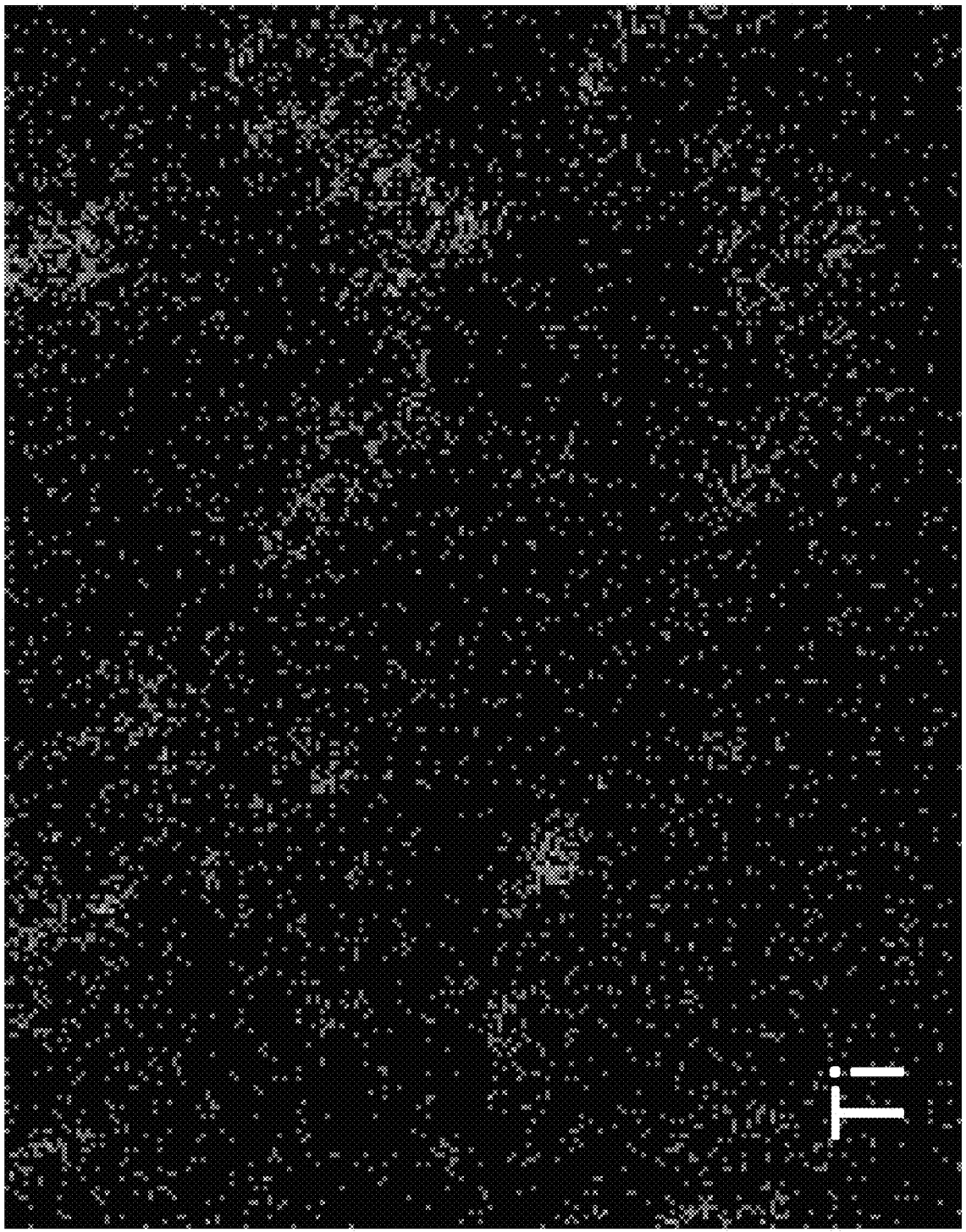
FIG. 13 is an element mapping image of Ti corresponding to the SEM image illustrated in FIG. 11.
Figure 14:
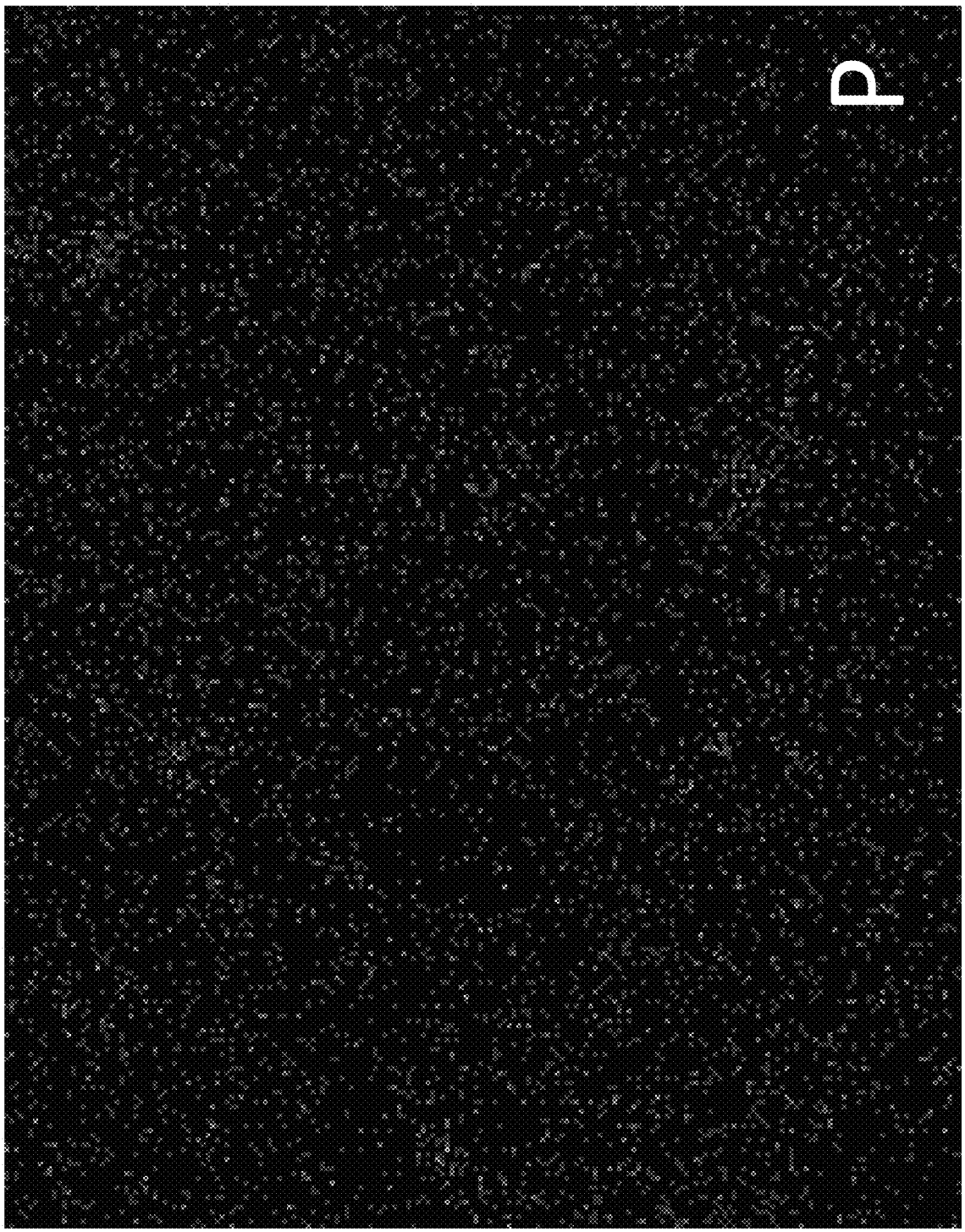
FIG. 14 is an element mapping image of P corresponding to the SEM image illustrated in FIG. 11.
Figure 15:
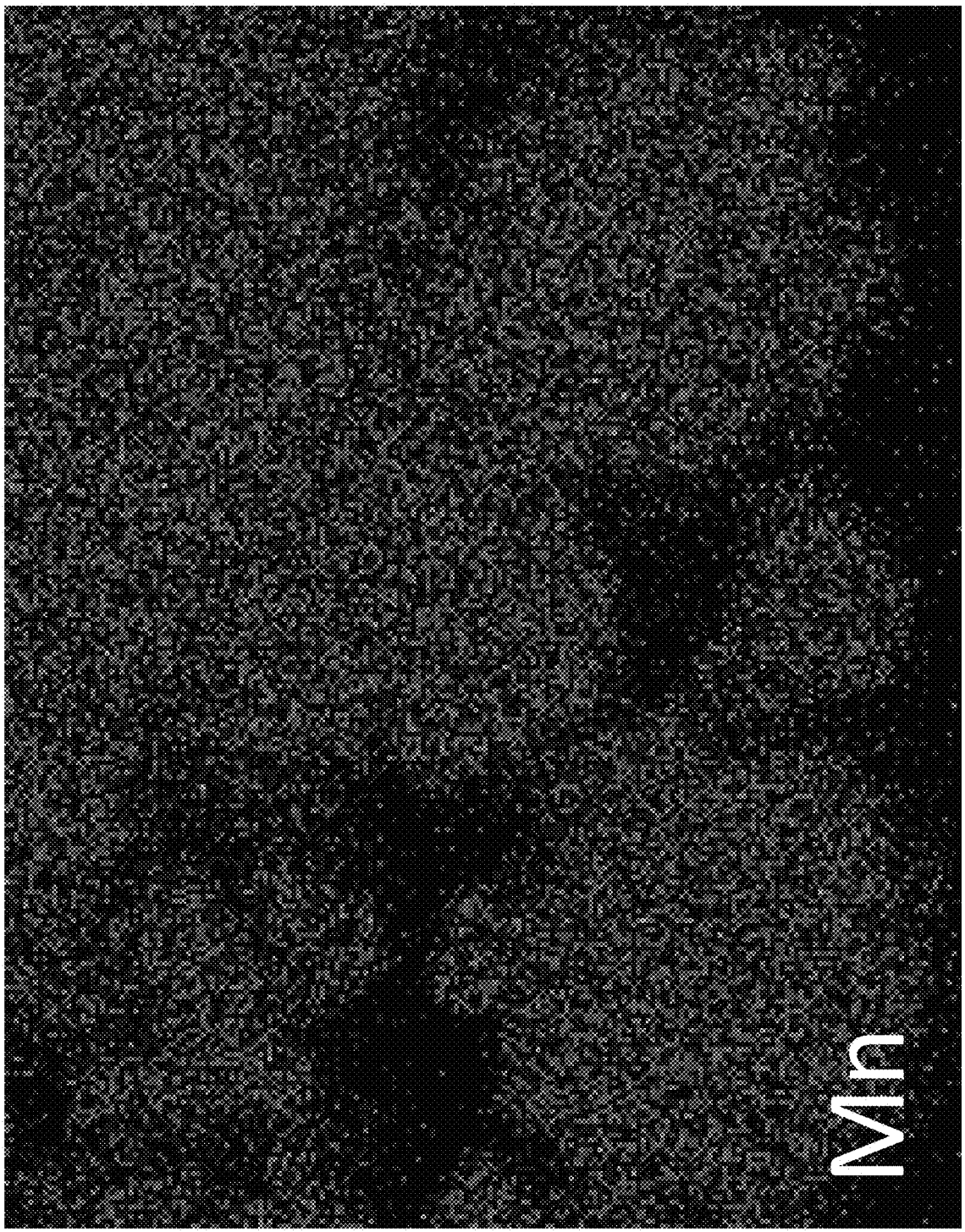
FIG. 15 is an element mapping image of Mn corresponding to the SEM image illustrated in FIG. 11.

As an example, images obtained by performing SEM-EDX on cross sections of the positive electrode according to Example 1 are illustrated in FIGS. 11 to 15. FIG. 11 illustrates an SEM image obtained by observing one of the cross sections of the positive electrode according to Example 1 with a magnification of 10,000 times by SEM. FIG. 12 illustrates an element mapping image of Ba corresponding to the SEM image illustrated in FIG. 11. FIG. 13 illustrates an element mapping image of Ti corresponding to the SEM image illustrated in FIG. 11. FIG. 14 illustrates an element mapping image of P corresponding to the SEM image illustrated in FIG. 11. FIG. 15 illustrates an element mapping image of Mn corresponding to the SEM image illustrated in FIG. 11. In FIG. 11, reference numeral 11 denotes an example of active material particles. Reference numeral 13 denotes an example of ferroelectric particles.

Example 1 is an example in which the $LiNi_{0.5}Co_{0.2}Mn_{0.3}O_2$ composite oxide containing Mn was used as the active material particles and barium titanate containing Ba and Ti was used as the ferroelectric particles. Therefore, when considering the element mapping images of Ba, Ti and Mn, that is, FIGS. 12, 13 and 15, in addition to the SEM image of FIG. 11, it is possible to calculate a ratio of the number of the ferroelectric particles in contact with the active material particles relative to the number of the ferroelectric particles within the scope of the field of view illustrated in FIG. 11. Specifically, the number of all the ferroelectric particles present within the scope of the field of view was 27 in the cross section, and the number of the ferroelectric particles in contact with the active material particles among them was 25.

Further, Example 1 is an example in which LATP ($Li_{1.5}AlTi_{1.5}(PO_4)_3$) containing P was used as the solid electrolyte particles. Therefore, when considering the element mapping images of P and Mn, that is, FIGS. 14 and 15, in addition to the SEM image of FIG. 11, it is possible to calculate a ratio of the number of the solid electrolyte particles not in contact with the active material particles relative to the number of the solid electrolyte particles within the scope of the field of view illustrated in FIG. 11. Specifically, the number of all the solid electrolyte particles present within the scope of the field of view was four in the cross section, and the number of the solid electrolyte particles not in contact with the active material particles among them was three.

The SEM image illustrated in FIG. 11 is an image of one of cross sections at the five points which have been described in the first embodiment. The SEM-EDX analysis was also performed for the remaining four cross sections. The ratio ($FE_{contact}$) of the number of the ferroelectric particles in contact with the active material particles relative to the number of the ferroelectric particles contained in the active material-containing layer, calculated in this manner for Example 1, was 93%. In addition, the ratio ($SE_{non-contact}$) of the number of the solid electrolyte particles not in contact with the active material particles relative to the number of the solid electrolyte particles contained in the active material-containing layer, calculated for Example 1, was 73%.

Figure 16:
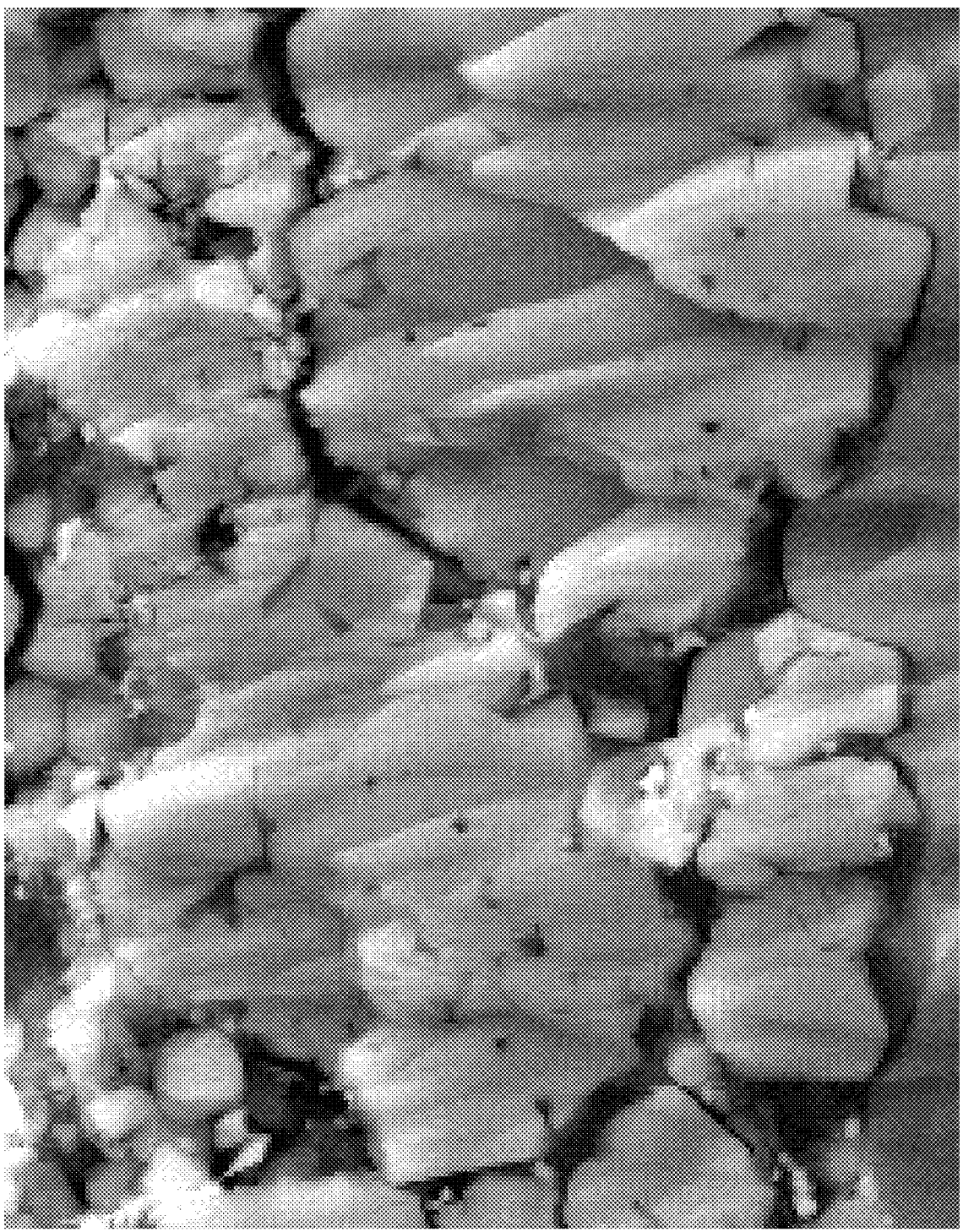
FIG. 16 illustrates an SEM image according to Example 2.
Figure 17:
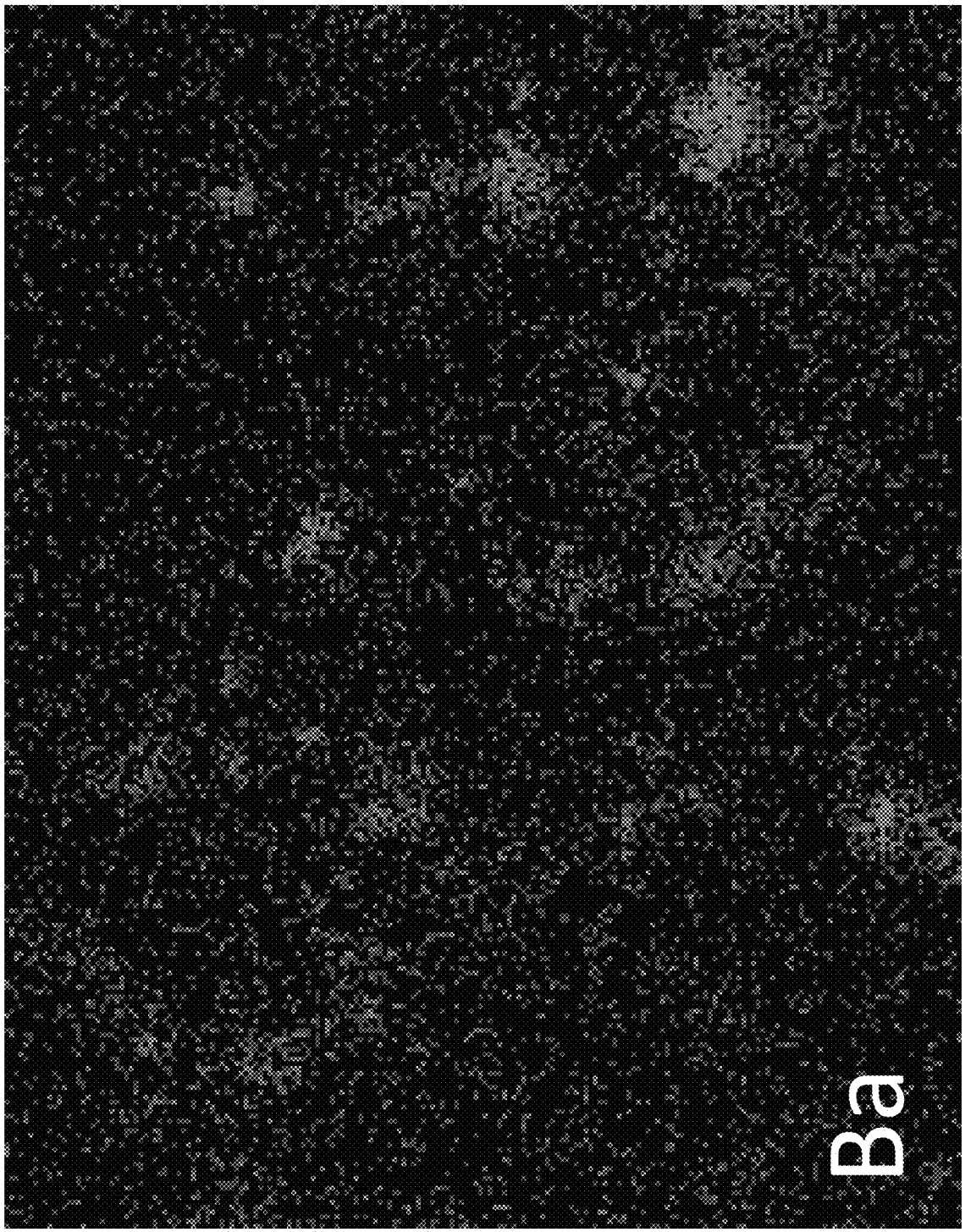
FIG. 17 is an element mapping image of Ba corresponding to the SEM image illustrated in FIG. 16.
Figure 18:
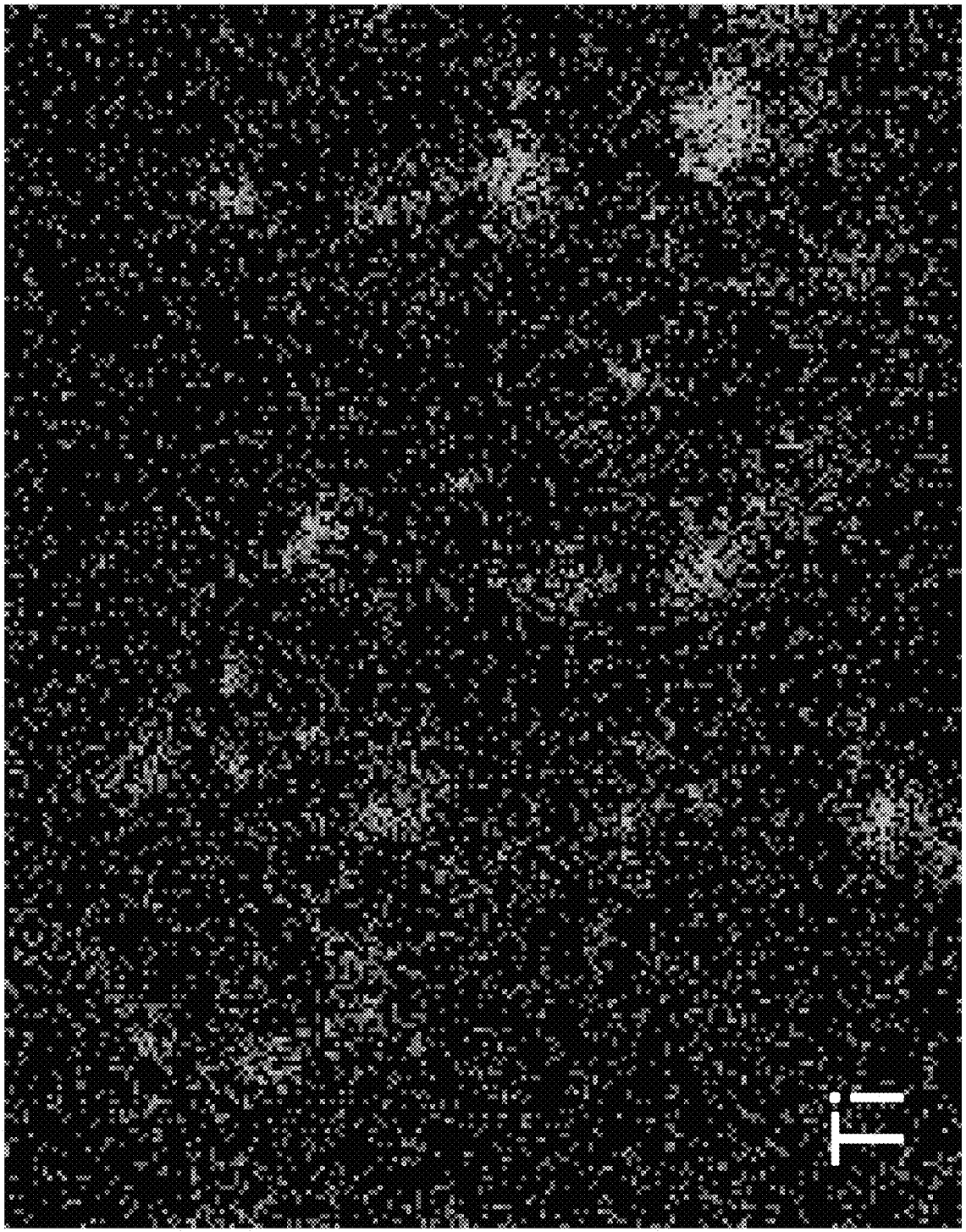
FIG. 18 is an element mapping image of Ti corresponding to the SEM image illustrated in FIG. 16.
Figure 19:
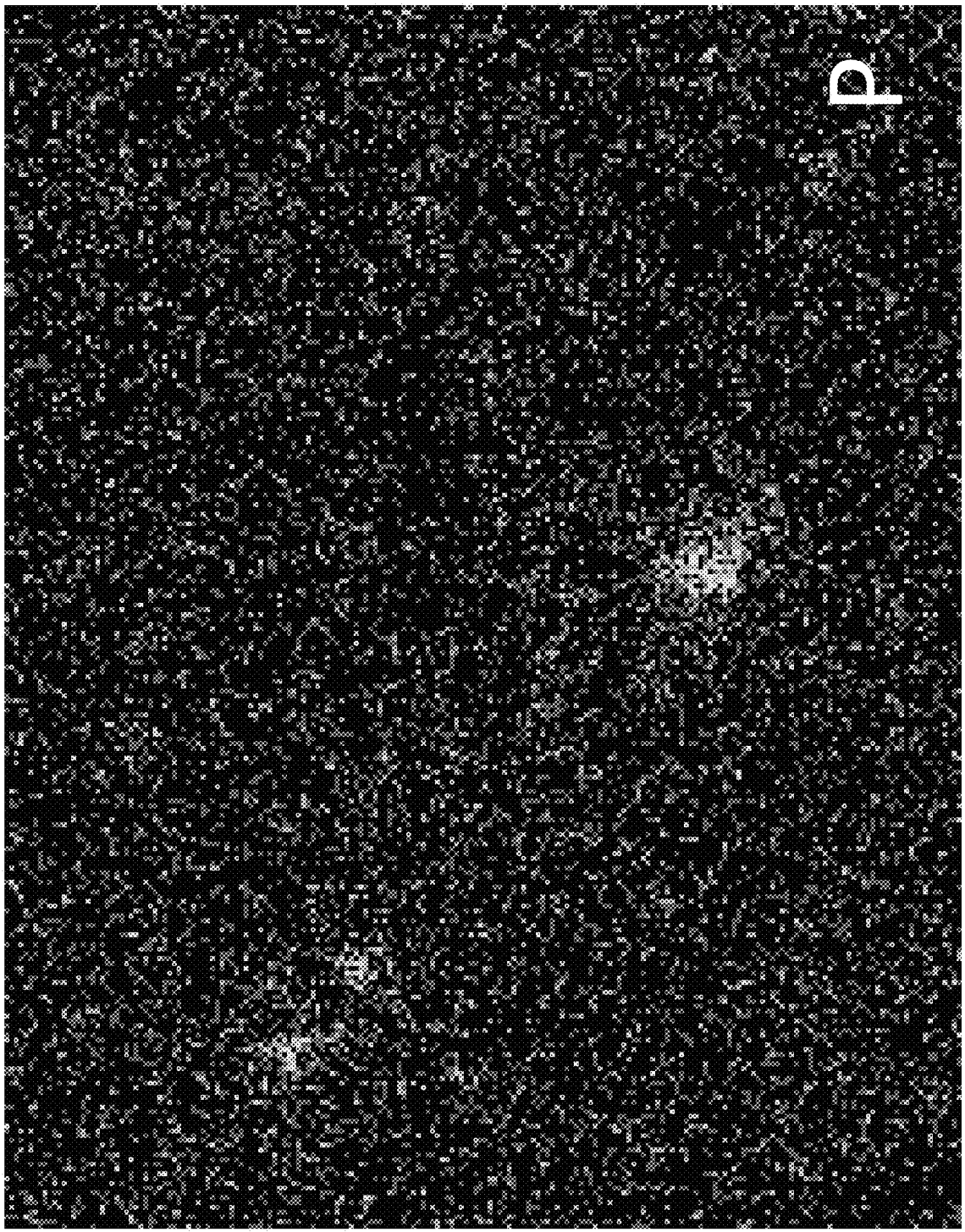
FIG. 19 is an element mapping image of P corresponding to the SEM image illustrated in FIG. 16.
Figure 20:
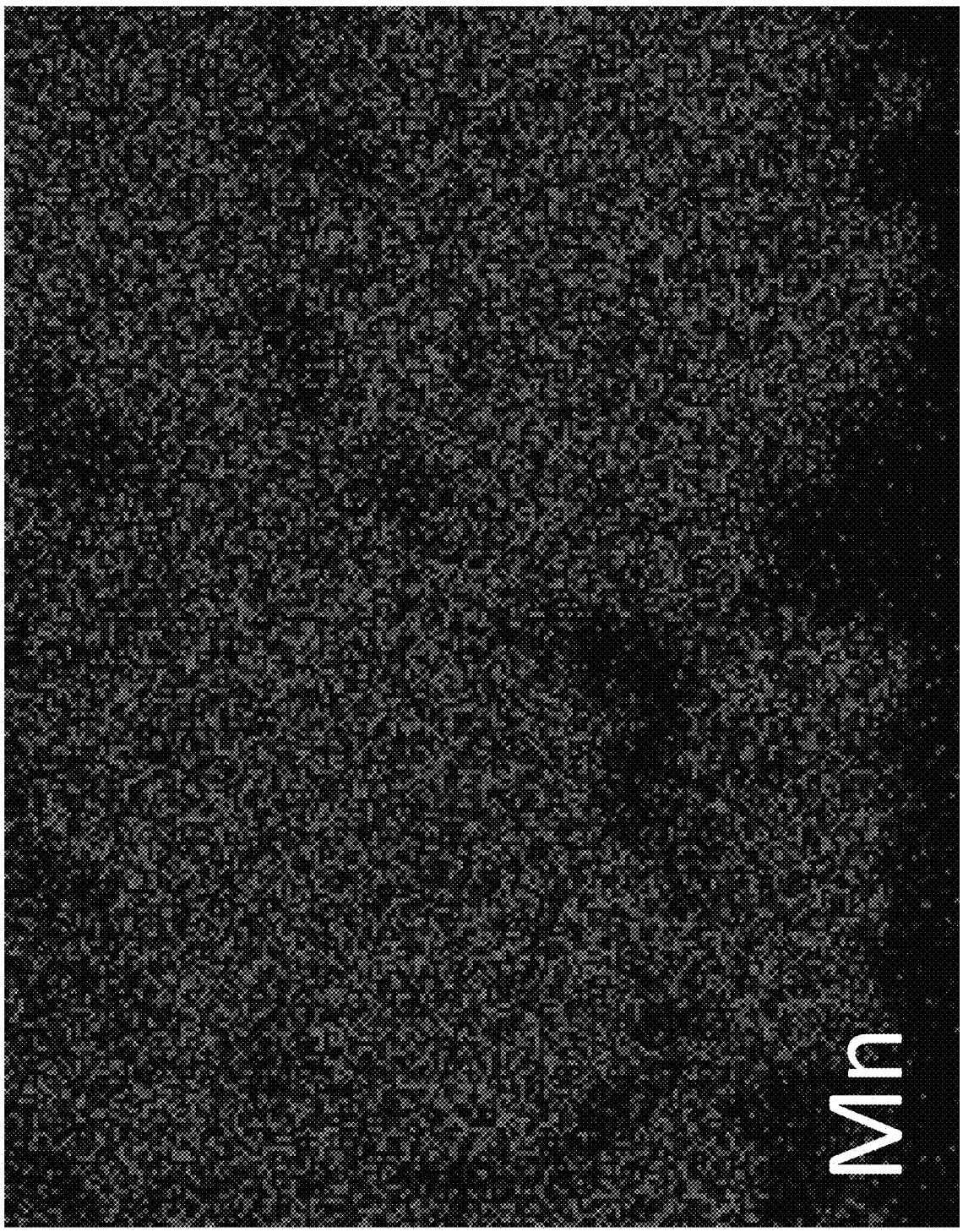
FIG. 20 is an element mapping image of Mn corresponding to the SEM image illustrated in FIG. 16.

As another example, images obtained by performing SEM-EDX on cross sections of the positive electrode according to Example 2 are illustrated in FIGS. 16 to 20. FIG. 16 illustrates an SEM image obtained by observing one of the cross sections of the positive electrode according to Example 2 with a magnification of 10,000 times by SEM. FIG. 17 illustrates an element mapping image of Ba corresponding to the SEM image illustrated in FIG. 16. FIG. 18 illustrates an element mapping image of Ti corresponding to the SEM image illustrated in FIG. 16. FIG. 19 illustrates an element mapping image of P corresponding to the SEM image illustrated in FIG. 16. FIG. 20 illustrates an element mapping image of Mn corresponding to the SEM image illustrated in FIG. 16.

Example 2 is an example in which the $LiNi_{0.5}Co_{0.2}Mn_{0.3}O_2$ composite oxide containing Mn was used as the active material particles and barium titanate containing Ba and Ti was used as the ferroelectric particles. Therefore, when considering the element mapping images of Ba, Ti and Mn, that is, FIGS. 17, 18, and 20, in addition to the SEM image of FIG. 16, it is possible to calculate a ratio of the number of the ferroelectric particles in contact with the active material particles relative to the number of the ferroelectric particles within the scope of the field of view illustrated in FIG. 16. Specifically, the number of all the ferroelectric particles present within the scope of the field of view was 28 in the cross section, and the number of the ferroelectric particles in contact with the active material particles among them was 26.

Further, Example 2 is an example in which LATP $(Li_{1.5}AlTi_{1.3}(PO_4)_3)$ containing P was used as the solid electrolyte particles. Therefore, when considering the element mapping images of P and Mn, that is, FIGS. 19 and 20, in addition to the SEM image of FIG. 16, it is possible to calculate a ratio of the number of the solid electrolyte particles not in contact with the active material particles relative to the number of the solid electrolyte particles within the scope of the field of view illustrated in FIG. 16. Specifically, the number of all the solid electrolyte particles present within the scope of the field of view was three in the cross section, and the number of the solid electrolyte particles not in contact with the active material particles among them was two.

The SEM image illustrated in FIG. 16 is an image of one of cross sections at the five points which have been described in the first embodiment. The SEM-EDX analysis was also performed for the remaining four cross sections. The ratio ($FE_{contact}$) of the number of the ferroelectric particles in contact with the active material particles relative to the number of the ferroelectric particles contained in the active material-containing layer, calculated in this manner for Example 2, was 93%. In addition, the ratio ($SE_{non-contact}$) of the number of the solid electrolyte particles not in contact with the active material particles relative to the number of the solid electrolyte particles contained in the active material-containing layer, calculated for Example 2, was 70%.

Figure 21:
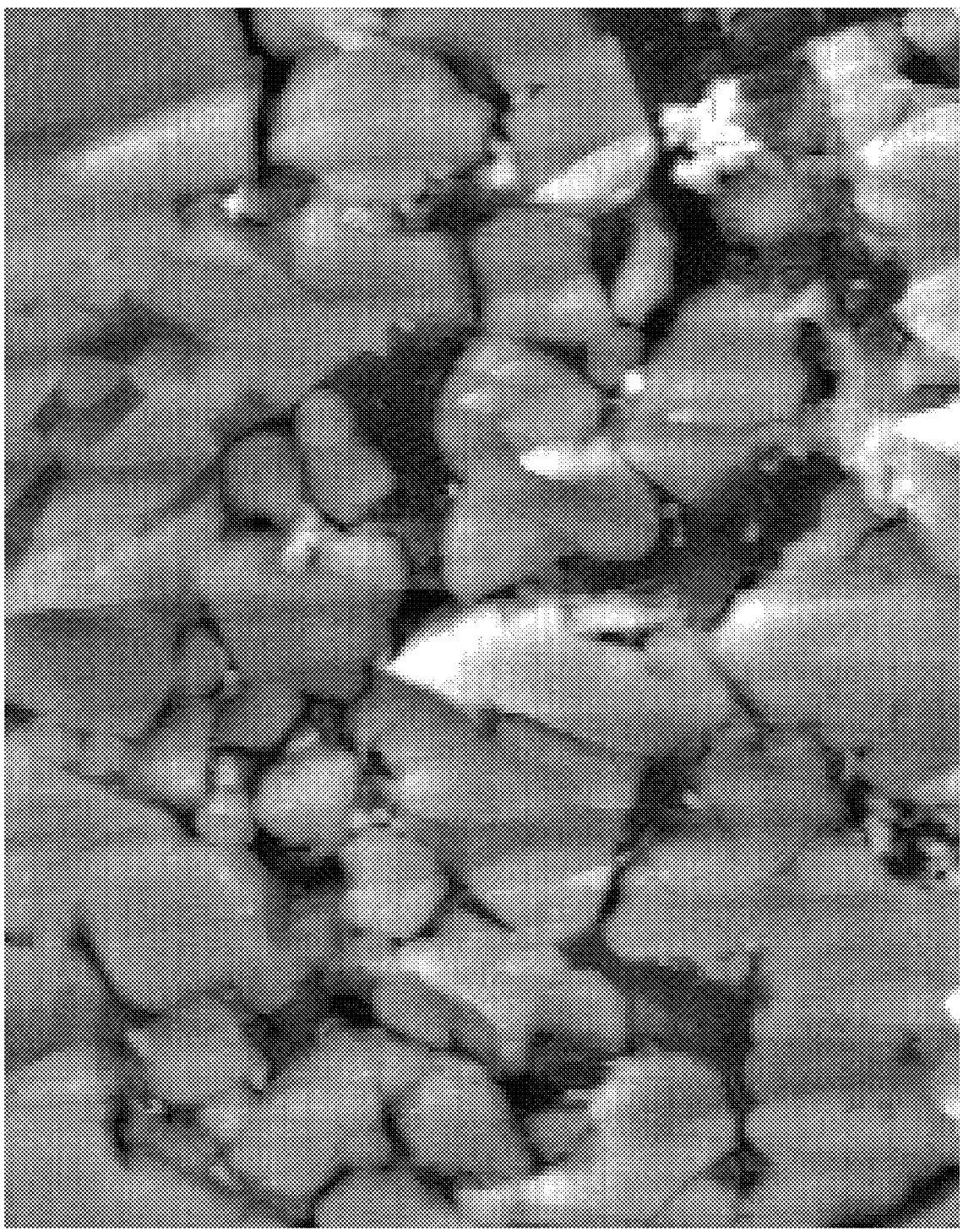
FIG. 21 illustrates an SEM image according to Comparative Example 1.
Figure 22:
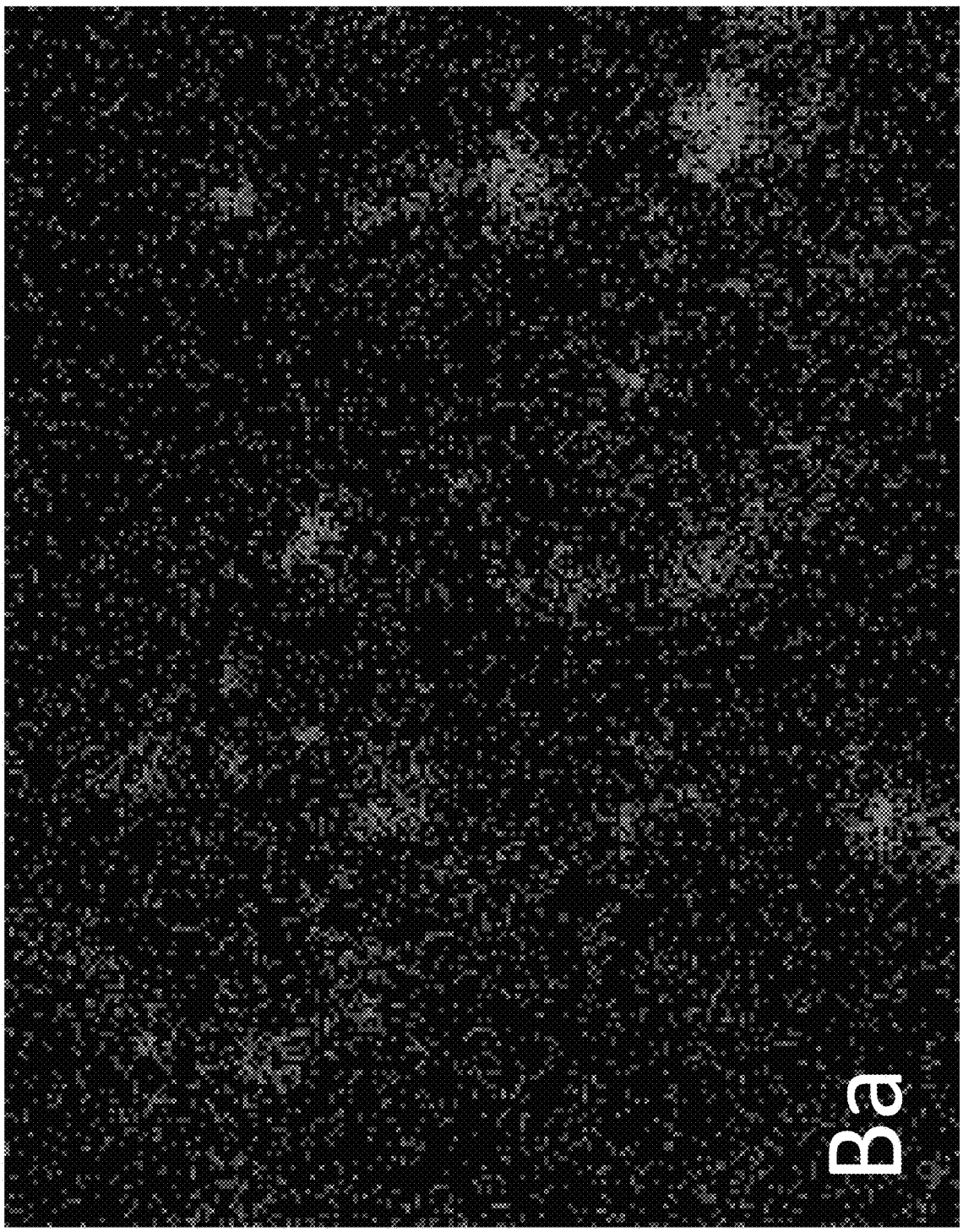
FIG. 22 is an element mapping image of Ba corresponding to the SEM image illustrated in FIG. 21.
Figure 23:
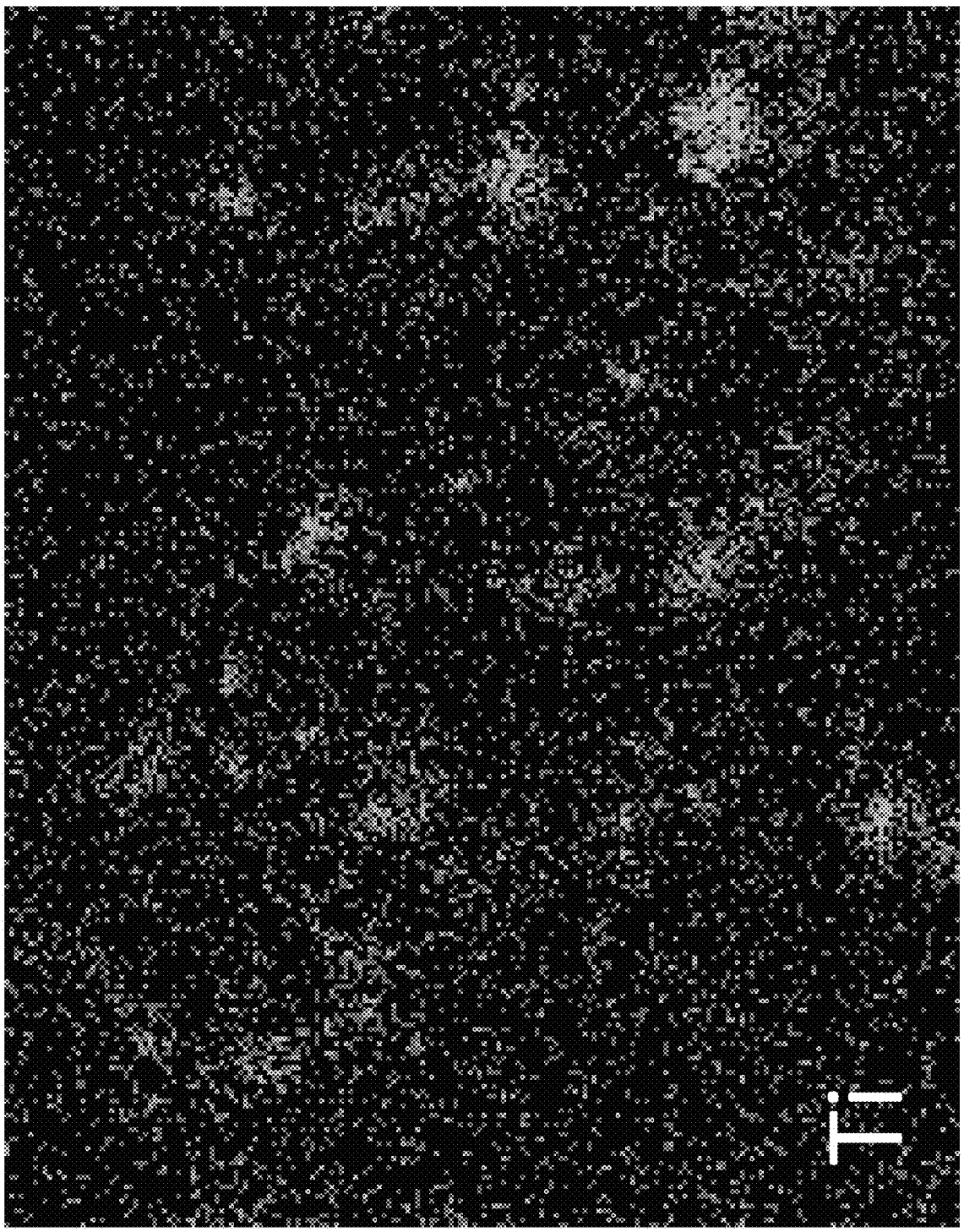
FIG. 23 is an element mapping image of Ti corresponding to the SEM image illustrated in FIG. 21.
Figure 24:
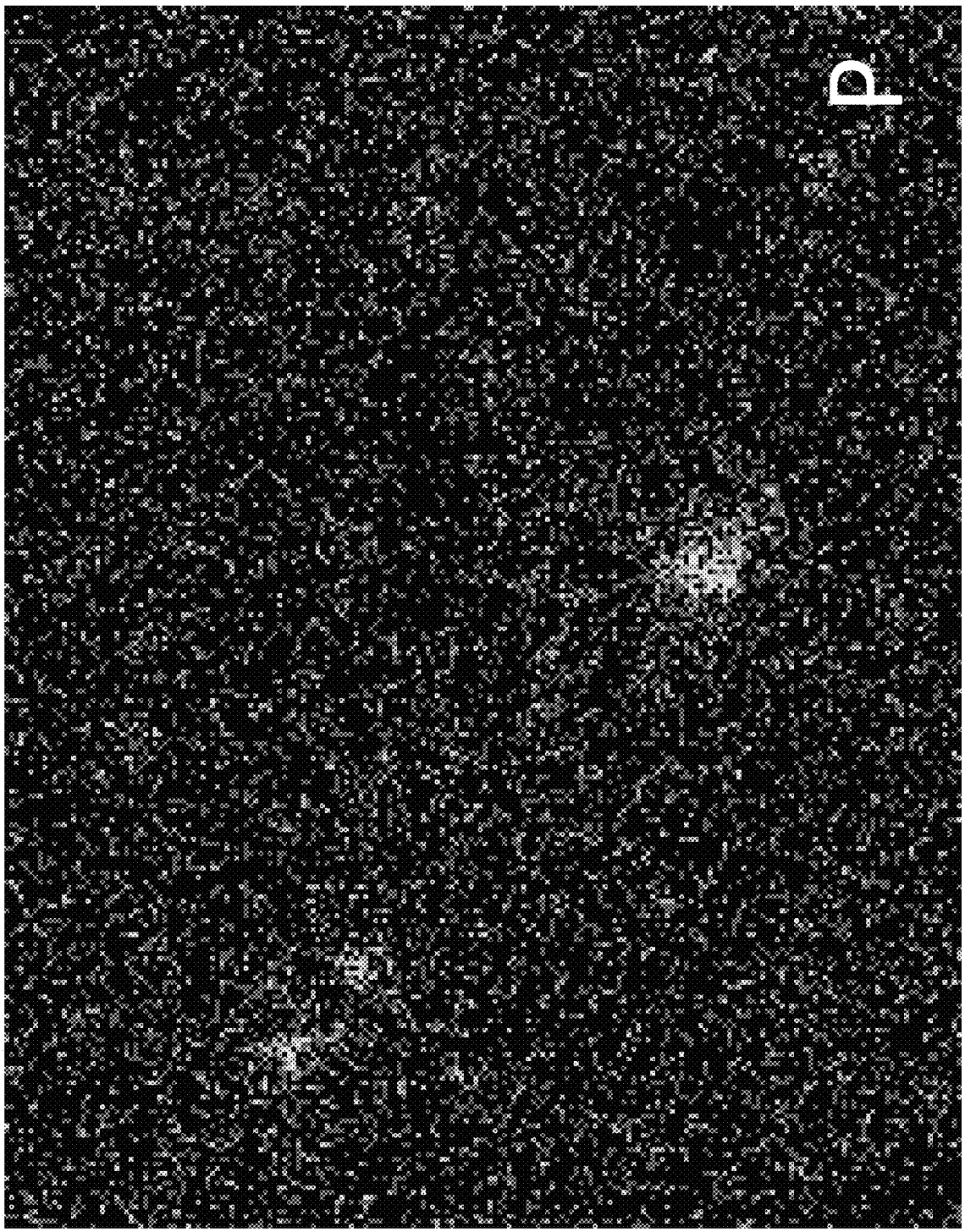
FIG. 24 is an element mapping image of P corresponding to the SEM image illustrated in FIG. 21.
Figure 25:
FIG. 25 is an element mapping image of Mn corresponding to the SEM image illustrated in FIG. 21.

As still another example, images obtained by performing SEM-EDX on cross sections of the positive electrode according to Comparative Example 1 are illustrated in FIGS. 21 to 25. FIG. 21 illustrates an SEM image obtained by observing one of the cross sections of the positive electrode according to Comparative Example 1 with a magnification of 10,000 times by SEM. FIG. 22 illustrates an element mapping image of Ba corresponding to the SEM image illustrated in FIG. 21. FIG. 23 illustrates an element mapping image of Ti corresponding to the SEM image illustrated in FIG. 21. FIG. 24 illustrates an element mapping image of P corresponding to the SEM image illustrated in FIG. 21. FIG. 25 illustrates an element mapping image of Mn corresponding to the SEM image illustrated in FIG. 21.

Comparative Example 1 is an example in which the $LiNi_{0.5}Co_{0.2}Mn_{0.3}O_2$ composite oxide containing Mn was used as the active material particles and barium titanate containing Ba and Ti was used as the ferroelectric particles. Therefore, when considering the element mapping images of Ba, Ti and Mn, that is, FIGS. 22, 23, and 25, in addition to the SEM image of FIG. 21, it is possible to calculate a ratio of the number of the ferroelectric particles in contact with the active material particles relative to the number of the ferroelectric particles within the scope of the field of view illustrated in FIG. 21. Specifically, the number of all the ferroelectric particles present within the scope of the field of view was 28 in the cross section, and the number of the ferroelectric particles in contact with the active material particles among them was thirteen.

Further, Comparative Example 1 is an example in which LATP $(Li_{1.5}AlTi_{1.5}(PO_4)_3)$ containing P was used as the solid electrolyte particles. Therefore, when considering the element mapping images of P and Mn, that is, FIGS. 24 and 25, in addition to the SEM image of FIG. 21, it is possible to calculate a ratio of the number of the solid electrolyte particles not in contact with the active material particles relative to the number of the solid electrolyte particles within the scope of the field of view illustrated in FIG. 21. Specifically, the number of all the solid electrolyte particles present within the scope of the field of view was three in the cross section, and the number of the solid electrolyte particles not in contact with the active material particles among them was two.

The SEM image illustrated in FIG. 21 is an image of one of cross sections at the five points which have been described in the first embodiment. The SEM-EDX analysis wa also performed for the remaining four cross sections. The ratio ($FE_{contact}$) of the number of the ferroelectric particles in contact with the active material particles relative to the number of the ferroelectric particles contained in the active material-containing layer, calculated in this manner for Comparative Example 1, was 46%. In addition, the ratio ($SE_{non-contact}$) of the number of the solid electrolyte particles not in contact with the active material particles relative to the number of the solid electrolyte particles contained in the active material-containing layer, calculated for Comparative Example 1, was 70%.

<Rate Performance Evaluation>

Each of the batteries produced in Examples 1 to 33 an Comparative Examples 1 to 5 was subjected to a rate test under an environment of 25° C. During charging and discharging, the battery was charged up to 3.0 V with 1 C, and then, was discharged up to 1.7 V with 1 C, and the capacity of the battery was confirmed, and then, the battery was discharged with a discharge current of 20 C to confirm the capacity of the battery.

<−30° C. Low-Temperature Performance Evaluation>

For each of the batteries produced in Examples 1 to 33 and Comparative Examples 1 to 5, low-temperature characteristics were evaluated under the following conditions. The battery is charged up to 3.0 V with 1 C under an environment of 25° C., a rest time of 2 hours under an environment of −30° C. is provided, and then, the battery is discharged up to 1.7 V with 1 C. A discharge capacity at −30° C. relative to a discharge capacity at 25° C. (discharge capacity at −30° C./discharge capacity at 25° C.×100) measured by the above rate performance evaluation was calculated.

Tables 1 to 3 show results of the above calculation.

In Table 1, the column "rate performance" shows a value, obtained by dividing a discharge capacity with 20 C by a discharge capacity with 1 C in the above rate performance evaluation and multiplying the resultant by 100, in a percentage. The column, "low-temperature performance" shows a value, obtained by dividing a discharge capacity at −30° C. by a discharge capacity at 25° C. in the above −30° C. low-temperature performance evaluation and multiplying the resultant by 100, in a percentage.

In Tables 2 and 3, the column, "composite electrode" shows an electrode to which solid electrolyte particles and ferroelectric particles are added. In the columns, "positive electrode" and "negative electrode", a ratio ($FE_{contact}$) and a ratio ($SE_{non-contact}$) are described only when the electrode is the composite positive electrode or the negative electrode. A ratio ($FE_{contact}$) and a ratio ($SE_{non-contact}$) indicated by "-" when the positive electrode and the negative electrode are not the composite electrode.

TABLE 1

|  | Positive Electrode Active Material | | Negative Electrode Active Material | | | | |
|---|---|---|---|---|---|---|---|
|  | Kind | Average Particle Size of Primary Particles (μm) | Kind | Average Particle Size of Primary Particles (μm) | Electrolyte Form | Rate performance (%) | Low-Temperature Performance (%) |
| Example 1 | $LiNi_{0.5}Co_{0.2}Mn_{0.3}O_2$ | 2 | $Li_4Ti_5O_{12}$ | 0.6 | Electrolyte Solution | 25 | 30 |
| Example 2 | $LiNi_{0.5}Co_{0.2}Mn_{0.3}O_2$ | 2 | $Li_4Ti_5O_{12}$ | 0.6 | Electrolyte Solution | 23 | 28 |
| Example 3 | $LiNi_{0.5}Co_{0.2}Mn_{0.3}O_2$ | 2 | $Li_4Ti_5O_{12}$ | 0.6 | Electrolyte Solution | 24 | 25 |
| Example 4 | $LiNi_{0.5}Co_{0.2}Mn_{0.3}O_2$ | 2 | $Li_4Ti_5O_{12}$ | 0.6 | Electrolyte Solution | 25 | 27 |
| Example 5 | $LiNi_{0.5}Co_{0.2}Mn_{0.3}O_2$ | 2 | $Li_4Ti_5O_{12}$ | 0.6 | Electrolyte Solution | 30 | 34 |
| Example 6 | $LiNi_{0.5}Co_{0.2}Mn_{0.3}O_2$ | 2 | $Li_4Ti_5O_{12}$ | 0.6 | Electrolyte Solution | 28 | 32 |
| Example 7 | $LiNi_{0.5}Co_{0.2}Mn_{0.3}O_2$ | 2 | $Li_4Ti_5O_{12}$ | 0.6 | Electrolyte Solution | 23 | 27 |
| Example 8 | $LiNi_{0.5}Co_{0.2}Mn_{0.3}O_2$ | 2 | $Li_4Ti_5O_{12}$ | 0.6 | Electrolyte Solution | 25 | 28 |
| Example 9 | $LiNi_{0.5}Co_{0.2}Mn_{0.3}O_2$ | 2 | $Li_4Ti_5O_{12}$ | 0.6 | Electrolyte Solution | 25 | 29 |
| Example 10 | $LiNi_{0.5}Co_{0.2}Mn_{0.3}O_2$ | 2 | $Li_4Ti_5O_{12}$ | 0.6 | Electrolyte Solution | 24 | 30 |
| Example 11 | $LiNi_{0.5}Co_{0.2}Mn_{0.3}O_2$ | 2 | $Li_4Ti_5O_{12}$ | 0.6 | Electrolyte Solution | 25 | 29 |
| Example 12 | $LiNi_{0.5}Co_{0.2}Mn_{0.3}O_2$ | 2 | $Li_4Ti_5O_{12}$ | 0.6 | Electrolyte Solution | 23 | 28 |
| Example 13 | $LiNi_{0.5}Co_{0.2}Mn_{0.3}O_2$ | 2 | $Li_4Ti_5O_{12}$ | 0.6 | Electrolyte Solution | 24 | 28 |
| Example 14 | $LiNi_{0.5}Co_{0.2}Mn_{0.3}O_2$ | 2 | $Li_4Ti_5O_{12}$ | 0.6 | Electrolyte Solution | 24 | 29 |
| Example 15 | $LiNi_{0.5}Co_{0.2}Mn_{0.3}O_2$ | 2 | $Li_4Ti_5O_{12}$ | 0.6 | Electrolyte Solution | 25 | 30 |
| Example 16 | $LiNi_{0.5}Co_{0.2}Mn_{0.3}O_2$ | 2 | $Li_4Ti_5O_{12}$ | 0.6 | Electrolyte Solution | 23 | 29 |
| Example 17 | $LiNi_{0.5}Co_{0.2}Mn_{0.3}O_2$ | 2 | $Li_4Ti_5O_{12}$ | 0.6 | Gel Electrolyte | 20 | 23 |
| Example 18 | $LiNi_{0.5}Co_{0.2}Mn_{0.3}O_2$ | 2 | $Li_4Ti_5O_{12}$ | 0.6 | Gel Electrolyte | 19 | 22 |
| Example 19 | $LiNi_{0.6}Co_{0.2}Mn_{0.2}O_2$ | 1 | $Li_4Ti_5O_{12}$ | 0.6 | Electrolyte Solution | 20 | 26 |
| Example 20 | $LiNi_{0.8}Co_{0.1}Mn_{0.1}O_2$ | 1 | $Li_4Ti_5O_{12}$ | 0.6 | Electrolyte Solution | 15 | 24 |
| Example 21 | $LiMn_2O_4$ | 2 | $Li_4Ti_5O_{12}$ | 0.6 | Electrolyte Solution | 62 | 68 |
| Example 22 | $LiFe_{0.2}Mn_{0.8}PO_4$ | 0.2 | $Li_4Ti_5O_{12}$ | 0.6 | Electrolyte Solution | 55 | 61 |
| Example 23 | $LiNi_{0.5}Co_{0.2}Mn_{0.3}O_2$ | 2 | $Li_4Ti_5O_{12}$ | 0.6 | Electrolyte Solution | 34 | 39 |
| Example 24 | $LiNi_{0.5}Co_{0.2}Mn_{0.3}O_2$ | 2 | $Li_4Ti_5O_{12}$ | 0.6 | Electrolyte Solution | 33 | 39 |
| Example 25 | $LiNi_{0.5}Co_{0.2}Mn_{0.3}O_2$ | 2 | $Nb_2TiO_7$ | 2 | Electrolyte Solution | 21 | 28 |
| Example 26 | $LiNi_{0.5}Co_{0.2}Mn_{0.3}O_2$ | 2 | $Nb_2TiO_7$ | 2 | Electrolyte Solution | 20 | 26 |
| Example 27 | $LiNi_{0.5}Co_{0.2}Mn_{0.3}O_2$ | 2 | $Nb_2TiO_7$ | 2 | Electrolyte Solution | 22 | 27 |
| Example 28 | $LiNi_{0.5}Co_{0.2}Mn_{0.3}O_2$ | 2 | $Nb_2TiO_7$ | 2 | Electrolyte Solution | 21 | 26 |
| Example 29 | $LiNi_{0.5}Co_{0.2}Mn_{0.3}O_2$ | 2 | $Nb_2TiO_7$ | 2 | Electrolyte Solution | 30 | 35 |
| Example 30 | $LiNi_{0.5}Co_{0.2}Mn_{0.3}O_2$ | 2 | $Nb_2TiO_7$ | 2 | Electrolyte Solution | 28 | 32 |
| Example 31 | $LiNi_{0.5}Co_{0.2}Mn_{0.3}O_2$ | 2 | $Nb_2TiO_7$ | 2 | Gel Electrolyte | 16 | 21 |
| Example 32 | $LiNi_{0.5}Co_{0.2}Mn_{0.3}O_2$ | 2 | $Nb_2TiO_7$ | 2 | Gel Electrolyte | 16 | 22 |
| Example 33 | $LiNi_{0.5}Co_{0.2}Mn_{0.3}O_2$ | 2 | $Li_2Na_{1.8}Ti_{5.8}Nb_{0.2}O_{14}$ | 2 | Electrolyte Solution | 23 | 26 |
| Comparative Example 1 | $LiNi_{0.5}Co_{0.2}Mn_{0.3}O_2$ | 2 | $Li_4Ti_5O_{12}$ | 0.6 | Electrolyte Solution | 18 | 17 |
| Comparative Example 2 | $LiNi_{0.5}Co_{0.2}Mn_{0.3}O_2$ | 2 | $Li_4Ti_5O_{12}$ | 0.6 | Electrolyte Solution | 10 | 14 |
| Comparative Example 3 | $LiNi_{0.5}Co_{0.2}Mn_{0.3}O_2$ | 2 | $Li_4Ti_5O_{12}$ | 0.6 | Electrolyte Solution | 11 | 11 |
| Comparative Example 4 | $LiNi_{0.5}Co_{0.2}Mn_{0.3}O_2$ | 2 | $Li_4Ti_5O_{12}$ | 0.6 | Electrolyte Solution | 10 | 12 |
| Comparative Example 5 | $LiNi_{0.5}Co_{0.2}Mn_{0.3}O_2$ | 2 | $Li_4Ti_5O_{12}$ | 0.6 | Electrolyte Solution | 15 | 9 |

TABLE 2

|  |  | Solid Electrolyte | | | |
|---|---|---|---|---|---|
|  | Composite Electrode | Kind | Average Particle Size of Primary Particles (μm) | Contained Amount in Positive Electrode (wt %) | Contained Amount in Negative Electrode (wt %) |
| Example 1 | Positive Electrode | $Li_{1.5}AlTi_{1.5}(PO_4)_3$ | 1 | 2 | — |
| Example 2 | Positive Electrode | $Li_{1.5}AlTi_{1.5}(PO_4)_3$ | 5 | 2 | — |
| Example 3 | Positive Electrode | $Li_{1.5}AlTi_{1.5}(PO_4)_3$ | 0.1 | 2 | — |
| Example 4 | Positive Electrode | $Li_{1.5}AlTi_{1.5}(PO_4)_3$ | 0.5 | 2 | — |
| Example 5 | Positive Electrode | $Li_{1.5}AlTi_{1.5}(PO_4)_3$ | 1 | 2 | — |
| Example 6 | Positive Electrode | $Li_{1.5}AlTi_{1.5}(PO_4)_3$ | 1 | 2 | — |
| Example 7 | Positive Electrode | $Li_{1.5}AlTi_{1.5}(PO_4)_3$ | 1 | 2 | — |
| Example 8 | Positive Electrode | $Li_{1.2}Zr_{1.9}Ca_{0.1}(PO_4)_3$ | 1 | 2 | — |
| Example 9 | Positive Electrode | $Li_7La_3Zr_2O_{12}$ | 1 | 2 | — |
| Example 10 | Positive Electrode | $Li_{0.5}La_{0.5}TiO_3$ | 1 | 2 | — |
| Example 11 | Positive Electrode | $Li_{1.5}AlTi_{1.5}(PO_4)_3$ | 1 | 2 | — |

TABLE 2-continued

| | | | | | |
|---|---|---|---|---|---|
| Example 12 | Positive Electrode | $Li_{1.5}AlTi_{1.5}(PO_4)_3$ | 1 | 2 | — |
| Example 13 | Positive Electrode | $Li_{1.5}AlTi_{1.5}(PO_4)_3$ | 1 | 2 | — |
| Example 14 | Negative Electrode | $Li_{1.5}AlTi_{1.5}(PO_4)_3$ | 1 | — | 2 |
| Example 15 | Negative Electrode | $Li_{1.2}Zr_{1.9}Ca_{0.1}(PO_4)_3$ | 1 | — | 2 |
| Example 16 | Negative Electrode | $Li_{1.5}AlTi_{1.5}(PO_4)_3$ | 1 | — | 2 |
| Example 17 | Positive Electrode | $Li_{1.5}AlTi_{1.5}(PO_4)_3$ | 1 | 2 | — |
| Example 18 | Negative Electrode | $Li_{1.5}AlTi_{1.5}(PO_4)_3$ | 1 | — | 2 |
| Example 19 | Positive Electrode | $Li_{1.5}AlTi_{1.5}(PO_4)_3$ | 1 | 2 | — |
| Example 20 | Positive Electrode | $Li_{1.5}AlTi_{1.5}(PO_4)_3$ | 1 | 2 | — |
| Example 21 | Positive Electrode | $Li_{1.5}AlTi_{1.5}(PO_4)_3$ | 1 | 2 | — |
| Example 22 | Positive Electrode | $Li_{1.5}AlTi_{1.5}(PO_4)_3$ | 1 | 2 | — |

| | Ferroelectric | | | Positive Electrode | | Negative Electrode | |
|---|---|---|---|---|---|---|---|
| | Kind | Average Particle Size of Primary Particles (μm) | Contained Amount in Positive Electrode (wt %) | Contained Amount in Negative Electrode (wt %) | Ratio $FE_{contact}$ (%) | Ratio $SE_{non-contact}$ (%) | Ratio $FE_{contact}$ (%) | Ratio $SE_{non-contact}$ (%) |
| Example 1 | $BaTiO_3$ | 0.05 | 1 | — | 93 | 73 | — | — |
| Example 2 | $BaTiO_3$ | 0.05 | 1 | — | 93 | 70 | — | — |
| Example 3 | $BaTiO_3$ | 0.05 | 1 | — | 92 | 82 | — | — |
| Example 4 | $BaTiO_3$ | 0.05 | 1 | — | 92 | 79 | — | — |
| Example 5 | $BaTiO_3$ | 0.001 | 1 | — | 88 | 74 | — | — |
| Example 6 | $BaTiO_3$ | 0.01 | 1 | — | 90 | 75 | — | — |
| Example 7 | $BaTiO_3$ | 0.1 | 1 | — | 96 | 76 | — | — |
| Example 8 | $BaTiO_3$ | 0.05 | 1 | — | 94 | 73 | — | — |
| Example 9 | $BaTiO_3$ | 0.05 | 1 | — | 92 | 75 | — | — |
| Example 10 | $BaTiO_3$ | 0.05 | 1 | — | 93 | 75 | — | — |
| Example 11 | $ZrO_2$ | 0.05 | 1 | — | 91 | 74 | — | — |
| Example 12 | $TiO_2$ | 0.05 | 1 | — | 92 | 74 | — | — |
| Example 13 | $Al_2O_3$ | 0.05 | 1 | — | 93 | 73 | — | — |
| Example 14 | $BaTiO_3$ | 0.05 | — | 1 | — | — | 91 | 44 |
| Example 15 | $BaTiO_3$ | 0.05 | — | 1 | — | — | 90 | 48 |
| Example 16 | $Al_2O_3$ | 0.05 | — | 1 | — | — | 93 | 42 |
| Example 17 | $BaTiO_3$ | 0.05 | 1 | — | 93 | 75 | — | — |
| Example 18 | $BaTiO_3$ | 0.05 | — | 1 | — | — | 91 | 45 |
| Example 19 | $BaTiO_3$ | 0.05 | 1 | — | 95 | 74 | — | — |
| Example 20 | $BaTiO_3$ | 0.05 | 1 | — | 96 | 73 | — | — |
| Example 21 | $BaTiO_3$ | 0.05 | 1 | — | 94 | 73 | — | — |
| Example 22 | $BaTiO_3$ | 0.05 | 1 | — | 96 | 74 | — | — |

TABLE 3

| | | Solid Electrolyte | | | |
|---|---|---|---|---|---|
| | Composite Electrode | Kind | Average Particle Size of Primary Particles (μm) | Contained Amount in Positive Electrode (wt %) | Contained Amount in Negative Electrode (wt %) |
| Example 23 | Positive Electrode, Negative Electrode | $Li_{1.5}AlTi_{1.5}(PO_4)_3$ | 1 | 2 | 2 |
| Example 24 | Positive Electrode, Negative Electrode | $Li_{1.2}Zr_{1.9}Ca_{0.1}(PO_4)_3$ | 1 | 2 | 2 |
| Example 25 | Positive Electrode | $Li_{1.5}AlTi_{1.5}(PO_4)_3$ | 1 | 2 | — |
| Example 26 | Positive Electrode | $Li_{1.2}Zr_{1.9}Ca_{0.1}(PO_4)_3$ | 1 | 2 | — |
| Example 27 | Negative Electrode | $Li_{1.5}AlTi_{1.5}(PO_4)_3$ | 1 | — | 2 |
| Example 28 | Negative Electrode | $Li_{1.2}Zr_{1.9}Ca_{0.1}(PO_4)_3$ | 1 | — | 2 |
| Example 29 | Positive Electrode, Negative Electrode | $Li_{1.5}AlTi_{1.5}(PO_4)_3$ | 1 | 2 | 2 |
| Example 30 | Positive Electrode, Negative Electrode | $Li_{1.2}Zr_{1.9}Ca_{0.1}(PO_4)_3$ | 1 | 2 | 2 |
| Example 31 | Positive Electrode | $Li_{1.5}AlTi_{1.5}(PO_4)_3$ | 1 | 2 | — |
| Example 32 | Negative Electrode | $Li_{1.5}AlTi_{1.5}(PO_4)_3$ | 1 | — | 2 |
| Example 33 | Positive Electrode | $Li_{1.5}AlTi_{1.5}(PO_4)_3$ | 1 | 2 | — |
| Composite Electrode 1 | Positive Electrode | $Li_{1.5}AlTi_{1.5}(PO_4)_3$ | 1 | 2 | — |
| Composite Electrode 2 | Positive Electrode | $Li_{1.5}AlTi_{1.5}(PO_4)_3$ | 1 | 10 | — |
| Composite Electrode 3 | Positive Electrode | $Li_{1.5}AlTi_{1.5}(PO_4)_3$ | 1 | 2 | — |
| Composite Electrode 4 | Positive Electrode | $Li_{1.5}AlTi_{1.5}(PO_4)_3$ | 1 | 2 | — |
| Composite Electrode 5 | Positive Electrode | — | — | — | — |

TABLE 3-continued

| | | Ferroelectric | | | Positive Electrode | | Negative Electrode | |
|---|---|---|---|---|---|---|---|---|
| | Kind | Average Particle Size of Primary Particles (μm) | Contained Amount in Positive Electrode (wt %) | Contained Amount in Negative Electrode (wt %) | Ratio $FE_{contact}$ (%) | Ratio $SE_{non\text{-}contact}$ (%) | Ratio $FE_{contact}$ (%) | Ratio $SE_{non\text{-}contact}$ (%) |
| Example 23 | BaTiO$_3$ | 0.05 | 1 | 1 | 94 | 75 | 92 | 45 |
| Example 24 | BaTiO$_3$ | 0.05 | 1 | 1 | 93 | 75 | 92 | 46 |
| Example 25 | BaTiO$_3$ | 0.05 | 1 | — | 95 | 73 | — | — |
| Example 26 | BaTiO$_3$ | 0.05 | 1 | — | 94 | 74 | — | — |
| Example 27 | BaTiO$_3$ | 0.05 | — | 1 | — | — | 93 | 45 |
| Example 28 | BaTiO$_3$ | 0.05 | — | 1 | — | — | 94 | 45 |
| Example 29 | BaTiO$_3$ | 0.05 | 1 | 1 | 93 | 73 | 94 | 44 |
| Example 30 | BaTiO$_3$ | 0.05 | 1 | 1 | 93 | 74 | 92 | 45 |
| Example 31 | BaTiO$_3$ | 0.05 | 1 | — | 94 | 73 | — | — |
| Example 32 | BaTiO$_3$ | 0.05 | — | 1 | — | — | 91 | 44 |
| Example 33 | BaTiO$_3$ | 0.05 | 1 | — | 93 | 73 | — | — |
| Composite Electrode 1 | BaTiO$_3$ | 0.05 | 1 | — | 46 | 70 | — | — |
| Composite Electrode 2 | BaTiO$_3$ | 0.05 | 1 | — | 91 | 25 | — | — |
| Composite Electrode 3 | BaTiO$_3$ | 0.05 | 10 | — | 52 | 81 | — | — |
| Composite Electrode 4 | — | — | — | — | — | 70 | — | — |
| Composite Electrode 5 | BaTiO$_3$ | 0.05 | 1 | — | 95 | — | — | — |

In Examples 1 to 33 in which the ratio ($FE_{contact}$) was 85% or more and the ratio ($SE_{non\text{-}contact}$) was 30% or more, it was possible to achieve excellent rate performance and low-temperature performance as compared with Comparative Examples 1 to 5.

Examples 5 to 7 are examples each of which is obtained by changing the average primary particle size of the ferroelectric particles. Considering these three examples, the ratio ($FE_{contact}$) tends to decrease as the average primary particle size of barium titanate is smaller. On the other hand, Example 5 having a relatively low ratio ($FE_{contact}$) exhibits the most excellent performance in terms of the rate performance and low-temperature performance. Based on this result, it is understood that the average primary particle size of the ferroelectric particles is preferably small.

Example 1 is an example in which the battery includes the composite positive electrode, Example 14 is an example in which the battery includes the composite negative electrode, and Example 23 is an example in which the battery includes the composite positive electrode and the composite negative electrode. Since there is little difference in performance between Example 1 and Example 14, it is understood that a secondary battery exhibiting excellent rate performance and low-temperature performance can be obtained when the secondary battery includes either one of the composite positive electrode and the composite negative electrode. In addition, it is understood that a secondary battery exhibiting more excellent rate performance and low-temperature performance can be obtained by including both of the composite positive electrode and the composite negative electrode as in Example 23 as compared with the case where the secondary battery includes either one of the composite positive electrode and the composite negative electrode.

As illustrated in Comparative Example 1, it is understood that the ratio ($FE_{contact}$) becomes extremely low and the rate performance and the low-temperature performance are inferior when the ferroelectric particles are not supported on the surfaces of the active material particles in advance.

Further, as shown in Comparative Example 2 or 3, it is understood that the rate performance and low-temperature performance are inferior when the ratio ($FE_{contact}$) is less than 85% or the ratio ($SE_{non\text{-}contact}$) is less than 30% even if the electrode contains ferroelectric particles and solid electrolyte particles.

In Comparative Example 2, the ratio ($FE_{contact}$) is 91%, but the ratio ($SE_{non\text{-}contact}$) is 25%. That is, not only most of the ferroelectric particles are in contact with the active material particles but also most of the solid electrolyte particles are in contact with the active material particles. As a result, it is considered that a diffusion path of Li ions is blocked and the rate performance and the low-temperature performance become inferior.

As shown in Comparative Example 4, the rate performance and the low-temperature performance are inferior when the electrode does not contain ferroelectric particles.

As shown in Comparative Example 5, the rate performance and the low-temperature performance are inferior when the electrode does not contain solid electrolyte particles.

According to at least one embodiment and Example described above, the electrode is provided. The electrode includes an active material-containing layer containing active material particles, ferroelectric particles, and solid electrolyte particles having a Li ion conductivity of $1 \times 10^{-10}$ S/cm or more at 25° C. A ratio ($FE_{contact}$) of the number of the ferroelectric particles in contact with the active material particles relative to the number of the ferroelectric particles included in the active material-containing layer is 85% or more. A ratio ($SE_{non\text{-}contact}$) of the number of the solid electrolyte particles not in contact with the active material particles relative to the number of the solid electrolyte particles included in the active material-containing layer is 30% or more. Therefore, it is possible to obtain the electrode capable of realizing a secondary battery having excellent input/output characteristics and energy density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-

What is claimed is:

1. A secondary battery comprising: a positive electrode; a negative electrode; and an electrolyte,
wherein the electrolyte comprises at least one of a liquid nonaqueous electrolyte and a gel nonaqueous electrolyte, and
at least one of the positive electrode and the negative electrode is an electrode comprising:
an active material-containing layer comprising active material particles, ferroelectric particles, and solid electrolyte particles having a Li ion conductivity of $1 \times 10^{-10}$ S/cm or more at 25° C.,
wherein
a proportion of the ferroelectric particles in the active material-containing layer is from 0.1% by mass to 5% by mass,
a proportion of the solid electrolyte particles in the active material-containing layer is from 0.1% by mass to 5% by mass,
a ratio ($FE_{contact}$) of a number of the ferroelectric particles in contact with the active material particles relative to a number of the ferroelectric particles included in the active material-containing layer is 85% or more, and
a ratio ($SE_{non-contact}$) of a number of the solid electrolyte particles not in contact with the active material particles relative to a number of the solid electrolyte particles included in the active material-containing layer is 30% or more.

2. The secondary battery according to claim 1, wherein an average primary particle size of the ferroelectric particles is within a range of 0.001 μm to 0.1 μm.

3. The secondary battery according to claim 1, wherein an average primary particle size of the solid electrolyte particles is within a range of 0.1 μm to 5 μm.

4. The secondary battery according to claim 1, wherein the ratio ($FE_{contact}$) is 90% or more.

5. The secondary battery according to claim 1, wherein the ratio ($SE_{non-contact}$) is 50% or more.

6. The secondary battery according to claim 1, wherein the ferroelectric particles comprise at least one selected from a group consisting of barium titanate, zirconia, titania, and alumina.

7. The secondary battery according to claim 1, wherein the active material-containing layer further comprises a conductive agent and a binder.

8. A battery pack comprising the secondary battery according to claim 1.

9. The battery pack according to claim 8, further comprising:
an external power distribution terminal; and
a protective circuit.

10. The battery pack according to claim 8, comprising plural of the secondary battery,
wherein the secondary batteries are electrically connected in series, in parallel, or in combination of series connection and parallel connection.

11. A vehicle, comprising the battery pack according to claim 8.

12. The vehicle according to claim 11, which comprises a mechanism configured to convert kinetic energy of the vehicle into regenerative energy.

13. The secondary battery according to claim 1, wherein an average primary particle size of the ferroelectric particles is within a range of 0.001 μm to 0.1 μm, and
an average primary particle size of the solid electrolyte particles is within a range of 0.1 μm to 5 μm.

* * * * *